(12) United States Patent
Watanabe et al.

(10) Patent No.: US 10,438,050 B2
(45) Date of Patent: Oct. 8, 2019

(54) IMAGE ANALYSIS DEVICE, IMAGE ANALYSIS SYSTEM, AND IMAGE ANALYSIS METHOD

(71) Applicant: Hitachi, Ltd., Chiyoda-ku, Tokyo (JP)

(72) Inventors: Yuki Watanabe, Tokyo (JP); Atsushi Hiroike, Tokyo (JP)

(73) Assignee: Hitachi, Ltd., Tokyo (JP)

(*) Notice: Subject to any disclaimer, the term of this patent is extended or adjusted under 35 U.S.C. 154(b) by 302 days.

(21) Appl. No.: 14/769,976

(22) PCT Filed: Feb. 27, 2013

(86) PCT No.: PCT/JP2013/055033
§ 371 (c)(1),
(2) Date: Aug. 24, 2015

(87) PCT Pub. No.: WO2014/132349
PCT Pub. Date: Sep. 4, 2014

(65) Prior Publication Data
US 2016/0005171 A1 Jan. 7, 2016

(51) Int. Cl.
*G06K 9/00* (2006.01)
*G06T 7/246* (2017.01)

(52) U.S. Cl.
CPC ..... *G06K 9/00281* (2013.01); *G06K 9/00268* (2013.01); *G06K 9/00677* (2013.01);
(Continued)

(58) Field of Classification Search
CPC ........... G06K 9/00268; G06K 9/00281; G06K 9/0067; G06T 7/0028; G06T 7/248; G06T 2207/10016; G06T 2207/20224
See application file for complete search history.

(56) References Cited

U.S. PATENT DOCUMENTS

| | | | |
|---|---|---|---|
| 6,529,630 B1 | 3/2003 | Kinjo | |
| 2007/0286488 A1* | 12/2007 | Fukuda | G06K 9/00228 382/190 |

(Continued)

FOREIGN PATENT DOCUMENTS

| | | |
|---|---|---|
| CN | 102867192 A | 1/2013 |
| CN | 102902826 A | 1/2013 |

(Continued)

OTHER PUBLICATIONS

Chinese-language Office Action issued in counterpart Chinese Application No. 201380073966.1 dated Jan. 23, 2017 (seven (7) pages).

(Continued)

*Primary Examiner* — Edward Park
(74) *Attorney, Agent, or Firm* — Crowell & Moring LLP

(57) ABSTRACT

An image analysis device according to the present invention includes a storage unit storing an image and information of a detected object included in the image, an input unit receiving a target image serving as a target in which an object is detected, a similar image search unit searching for a similar image having a feature quantity similar to a feature quantity extracted from the target image and the information of the object included in the similar image from the storage unit, a parameter deciding unit deciding a parameter used in a detection process performed on the target image based on the information of the object included in the similar image, a detecting unit detecting an object from the target image according to the decided parameter, a registering unit accumulating the target image in the storage unit, and a data output unit outputting the information of the detected object.

7 Claims, 15 Drawing Sheets

(52) U.S. Cl.
CPC .... *G06T 7/248* (2017.01); *G06T 2207/10016* (2013.01); *G06T 2207/20224* (2013.01)

(56) References Cited

U.S. PATENT DOCUMENTS

| | | | |
|---|---|---|---|
| 2008/0187175 A1* | 8/2008 | Kim | G06K 9/00268 382/103 |
| 2009/0141940 A1* | 6/2009 | Zhao | G06K 9/00295 382/103 |
| 2009/0316956 A1 | 12/2009 | Higuchi et al. | |
| 2010/0150408 A1* | 6/2010 | Ishikawa | G06K 9/00288 382/118 |
| 2010/0226532 A1* | 9/2010 | Hayasaka | G06K 9/6203 382/103 |
| 2012/0098961 A1* | 4/2012 | Handa | G01B 11/2518 348/135 |
| 2014/0149376 A1 | 5/2014 | Kutaragi et al. | |
| 2016/0005171 A1* | 1/2016 | Watanabe | G06K 9/00677 382/118 |

FOREIGN PATENT DOCUMENTS

| | | |
|---|---|---|
| JP | 11-261812 A | 9/1999 |
| JP | 2010-003254 A | 1/2010 |
| WO | WO 2012/176317 A1 | 12/2012 |

OTHER PUBLICATIONS

Viola, P. and Jones, M., "Robust Real-Time Object Detection", Second International Workshop on Statistical and Computational Theories of Vision—Modeling, Learning, Computing, and Sampling, Jul. 13, 2001, pp. 137-154, vol. 57, No. 2, Vancouver, Canada (Twenty-Five (25) pages).

* cited by examiner

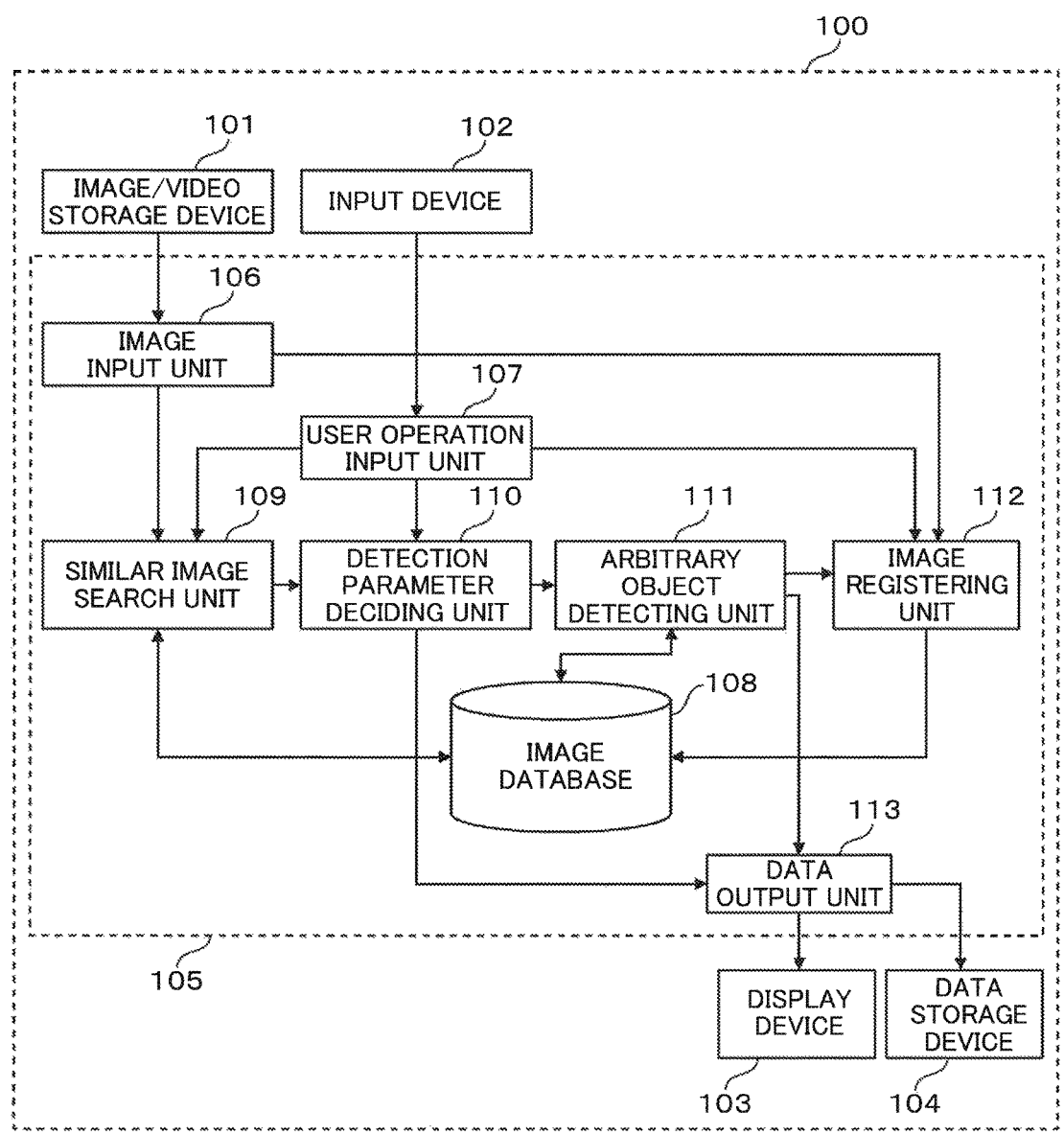
F I G. 1

FIG. 2A

| IMAGE ID | IMAGE DATA | IMAGE FEATURE QUANTITY | IMAGE SIZE |
|---|---|---|---|
| 1 | | [82, 16, 226, 96, 65, 28, 127, 223, ⋯] | [640, 480] |
| 2 | | [73, 18, 218, 76, 63, 23, 116, 238, ⋯] | [640, 480] |
| 3 | | [20, 175, 228, 187, 138, 106, 190, 107, ⋯] | [640, 480] |
| ⋯ | ⋯ | ⋯ | |

FIG. 2B

| OBJECT ID | IMAGE ID | REGION COORDINATES | IMAGE FEATURE QUANTITY |
|---|---|---|---|
| 1 | 1 | [300, 200, 330, 230] | [249, 118, 126, 151, 180, 216, 82, 155, ⋯] |
| 2 | 2 | [250, 200, 450, 400] | [136, 14, 107, 186, 51, 193, 136, 146, ⋯] |
| 3 | 3 | [50, 200, 350, 400] | [237, 237, 91, 211, 149, 248, 236, 231, ⋯] |
| 4 | 3 | [400, 250, 600, 250] | [235, 244, 99, 216, 158, 238, 245, 221, ⋯] |
| ⋯ | ⋯ | ⋯ | ⋯ |

F I G. 7
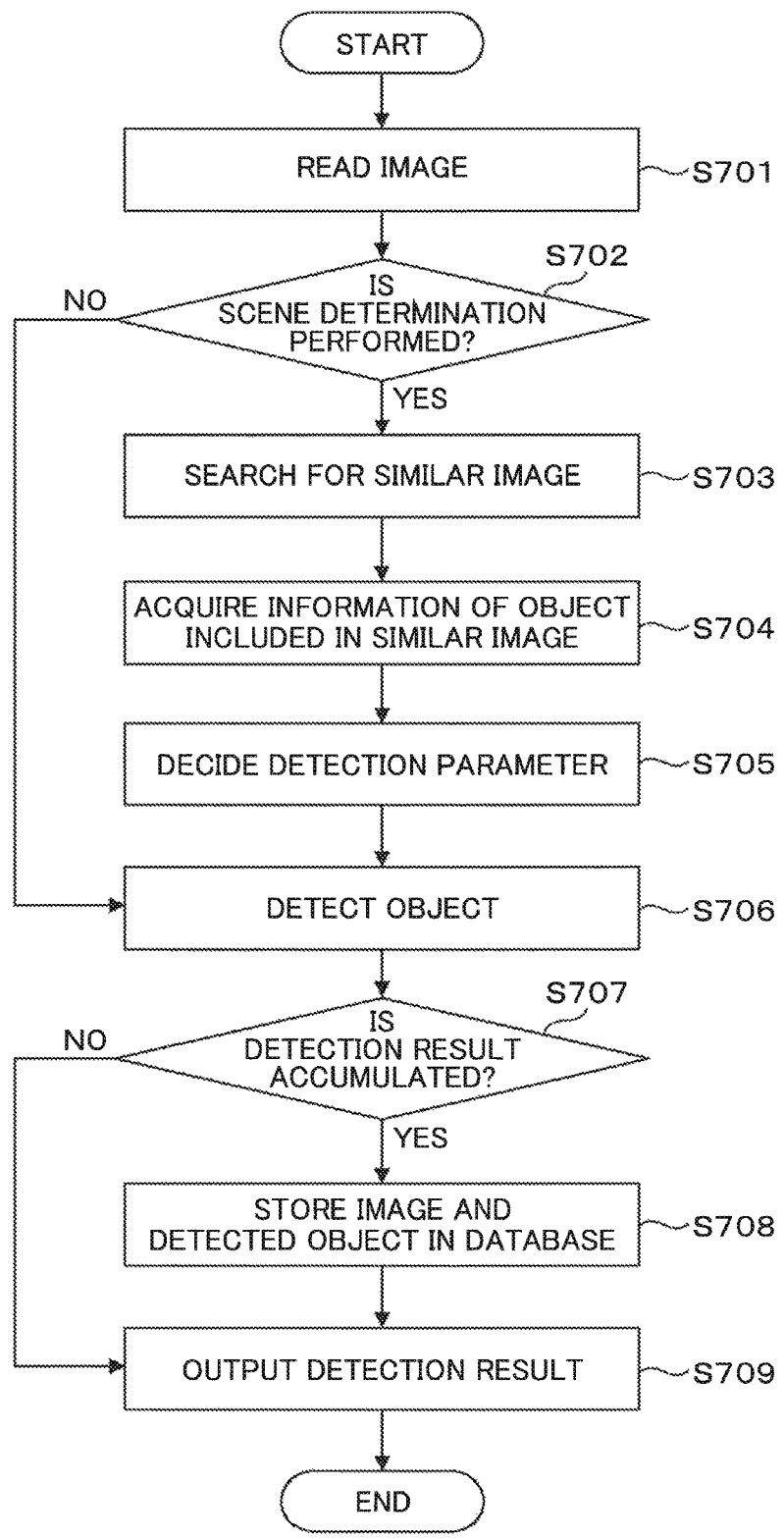

F I G. 1 5
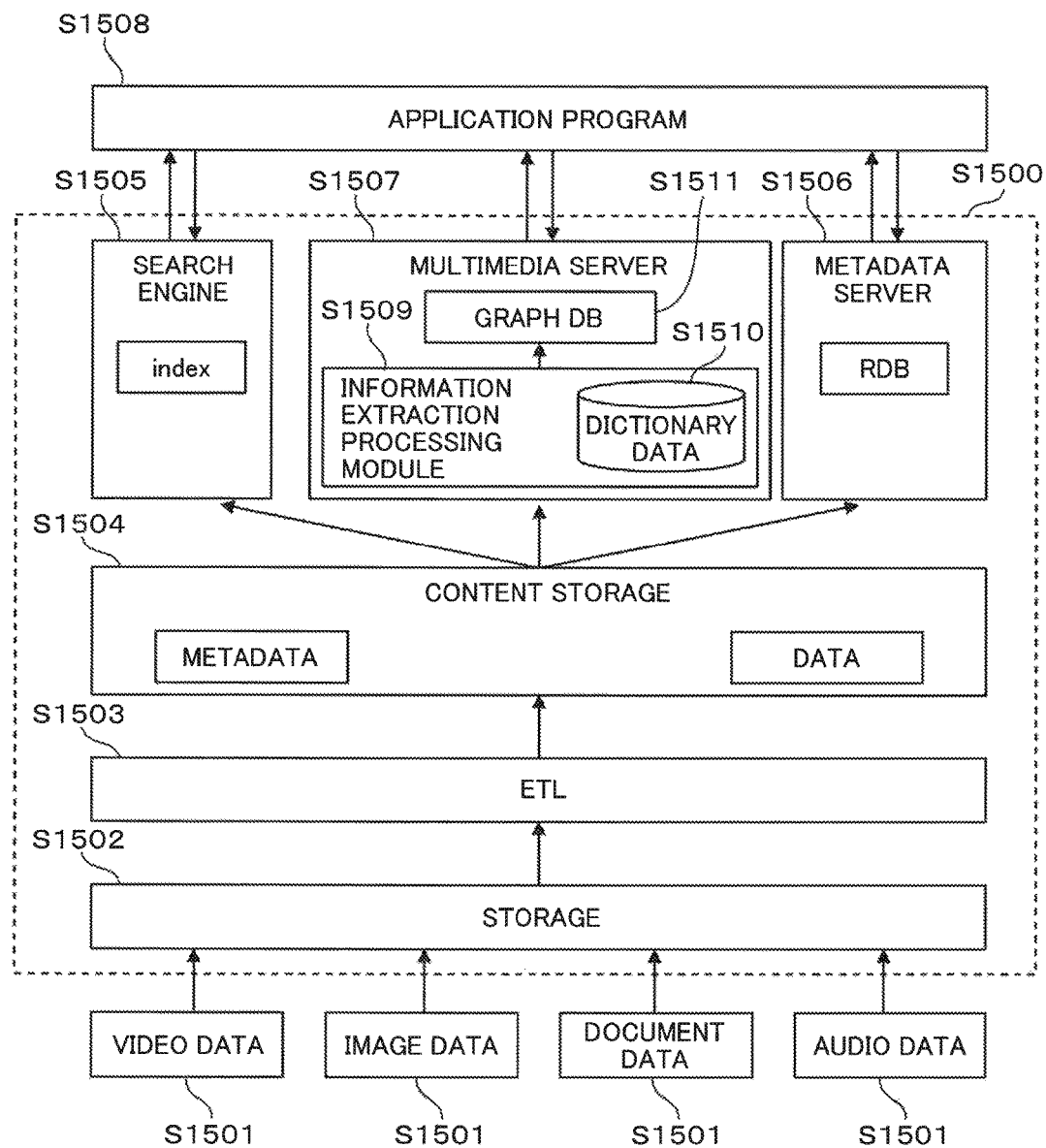

IMAGE ANALYSIS DEVICE, IMAGE ANALYSIS SYSTEM, AND IMAGE ANALYSIS METHOD

TECHNICAL FIELD

The present invention relates to a technique of detecting an arbitrary object region included in image data.

BACKGROUND ART

With the development of IT infrastructure, it became possible to accumulate a large amount of multimedia data (documents, videos, images, sounds, various log data, and the like) in a large capacity storage. In order to extract information efficiently from a large amount of accumulated data, various information extraction/search techniques for individual media data have been developed and put to practical use.

As an example of information extraction of multimedia data, a technique of detecting an object (indicating an object that is desired to be extracted or a part thereof, for example) or a specific region included in an image is considered. The detecting of an object in an image or the specifying of a region in an image corresponds to morphological analysis (a means of dividing a document into words and determining a part of speech) in document analysis, and it is an important technique in analyzing the meaning of an image.

As a technique of detecting an object in an image, a technique disclosed in Non-Patent Document 1 is widely known and input into production as a face recognition function in a digital camera or a monitoring system. In the technique disclosed in Non-Patent Document 1, a large amount of sample images of an object serving as a detection target are collected, and a plurality of weak identifiers are generated based on luminance values of the images through machine learning. An object region is specified by searching for partial regions in the image fully using a robust identifier obtained by coupling the weak identifiers.

At the present time, a frontal face of a person is commonest as a category of an object serving as a detection target. However, when a wide range of content accumulated in a storage is set as a target, it is desirable to set various categories such as vehicles, animals, buildings, diagrams, and various goods as a detection target. Further, in order to process a large amount of data, it is necessary to improve analysis process efficiency.

With respect to the improvement in the analysis process efficiency, Patent Document 1 described below discloses a technique of limiting a region that undergoes image processing for detecting an object region using an existence probability of an object. The technique disclosed in Patent Document 1 decides a region that undergoes image processing using static information of an imaging system such as a focal distance or a resolution, and is considered to be effective in an environment in which a photographing environment or a photographing device is limited as in an in-vehicle camera, and structured data is managed.

CITATION LIST

Patent Document

Patent Document 1: JP 2010-003254 A

Non-Patent Document

Non-Patent Document 1: P. Viola and M. Jones, "Robust real-time object detection," IJCV2001, Vol. 57, No. 2, pp. 137 to 154, 2002.

SUMMARY OF THE INVENTION

Problems to be Solved by the Invention

The technique disclosed in Patent Document 1 is made under the assumption that a photographing environment is roughly specified, and data serving as an image processing target is structured. However, commonly, it is not necessarily possible to predict a photographing environment or a position of a subject in advance. Further, in an environment in which data serving as an image processing target is generated in an ad hoc, the data is not structured. In this environment, the technique disclosed in Patent Document 1 is not considered to be effective in reducing a time taken to detect an object.

The technique disclosed in Non-Patent Document 1 is effective, for example, when a detection object is decided in advance as in face detection, but in the purpose in which the user sequentially designates detection objects, the technique disclosed in Non-Patent Document 1 is impractical in terms of a processing time since it is necessary to execute sample collection and machine learning each time.

The present invention was made in light of the above problems, and it is an object of the present invention to provide an image analysis technique capable of detecting a detection object from image data at a high speed.

Solutions to Problems

In order to solve the above problems, for example, configurations set forth in claims are employed. The present invention includes a plurality of devices capable of solving the above problems, but provides, as an example thereof, an image analysis device which includes an image storage unit that stores an image and information of a detected object included in the image, an image input unit that receives a target image serving as a target in which an object is detected, a similar image search unit that searches for a similar image having a feature quantity similar to a feature quantity extracted from the target image and the information of the detected object included in the similar image from the image storage unit, a detection parameter deciding unit that decides a parameter used in a detection process performed on the target image based on the information of the detected object included in the similar image, an arbitrary object detecting unit that detects an object from the target image according to the decided parameter, an image registering unit that accumulates the detected object and the target image in the image storage unit, and a data output unit that outputs the information of the detected object.

Alternatively, provided is an image analysis method of detecting an object from an input target image, which includes an extraction step of extracting a feature quantity of the target image, a search step of searching for a similar image having a feature quantity similar to the extracted feature quantity of the target image from an image storage unit, a decision step of deciding a parameter used in a detection process on the target image based on information of a detected object included in the searched similar image, a detection step of performing a detection process on the target image based on the decided parameter to detect an object, a step of outputting the object detected from the target image, and a storage step of storing the target image and the detected object in the image storage unit.

Effects of the Invention

An image analysis device according to the present invention can extract an arbitrary object from an image at a high speed. A problem, a configuration, and an effect that are not mentioned above will become apparent from description of the following embodiments.

BRIEF DESCRIPTION OF THE DRAWINGS

FIG. 1 is a configuration diagram of an image analysis system 100 according to a first embodiment.

FIGS. 2A and 2B are diagrams illustrating a configuration and exemplary data of an image database 108.

FIG. 7 is a flowchart for describing a process of performing object detection based on scene determination through an image analysis device 105.

FIG. 15 is a schematic diagram of a content cloud system 1500 according to a third embodiment.

MODE FOR CARRYING OUT THE INVENTION

Figure 3:
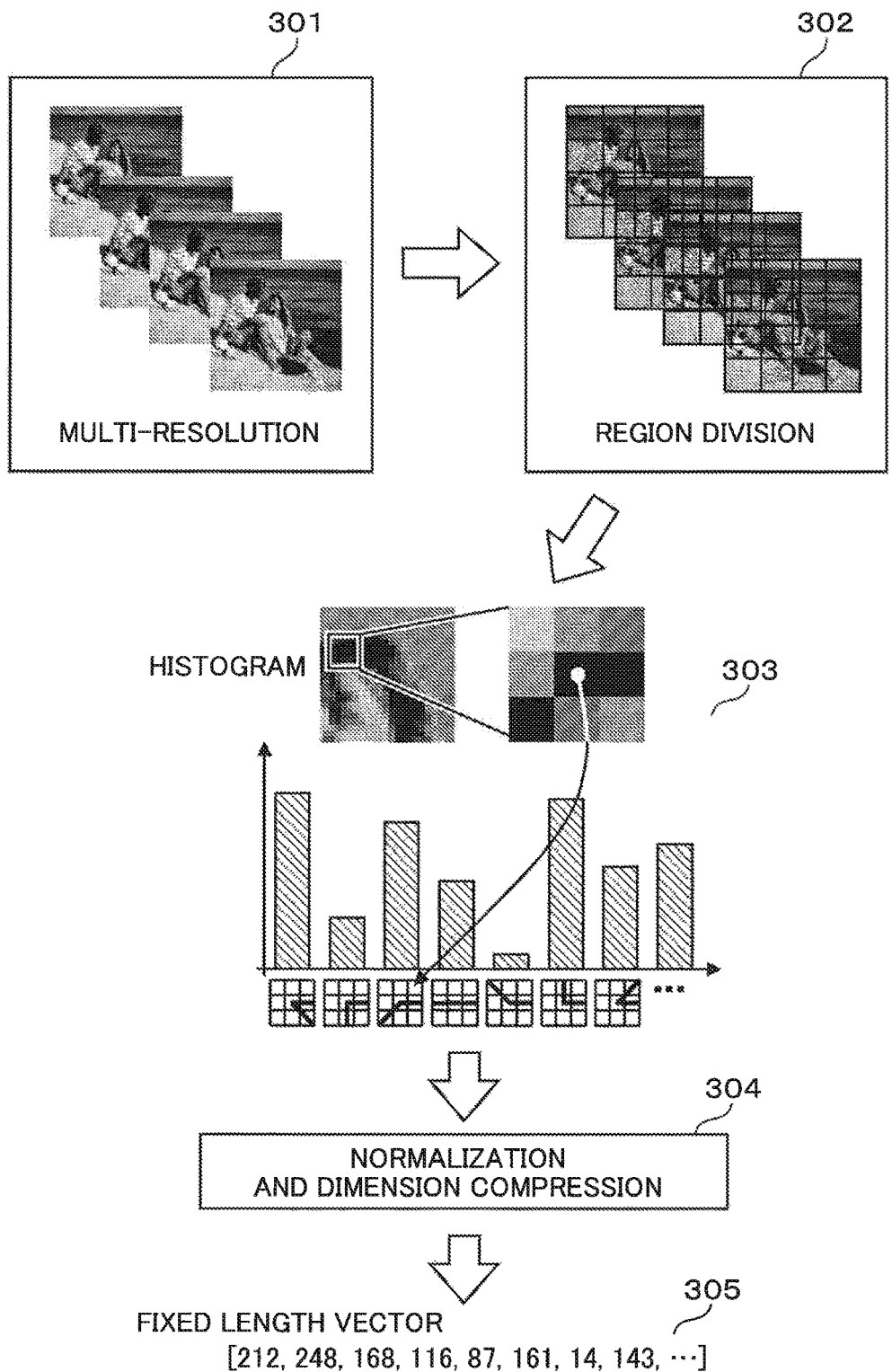
FIG. 3 is a diagram for describing an image feature quantity extraction process and a similar image search in a similar image search unit 109.

First Embodiment
<System Configuration>

FIG. 1 is a configuration diagram of an image analysis system 100 according to a first embodiment of the present invention. The image analysis system 100 is a system that is tended to detect a region of an object similar to template image registered by the user from a large amount of accumulated images. The image analysis system 100 includes an image/video storage device 101, an input device 102, a display device 103, a data storage device 104, and an image analysis device 105. Although not illustrated in FIG. 1, a camera may be equipped so that a video from a monitoring camera can be directly analyzed.

The image/video storage device 101 is a storage medium that stores image data and video (moving image) data, and may be configured using a hard disk drive connected directly to a computer or a storage system connected via a network such as a Network Attached Storage (NAS) or a Storage Area Network (SAN). Further, for example, the image/video storage device 101 may be a cache memory that temporarily holds video data consecutively input from a camera. As a size of a processing target by the image analysis system 100, large-scale data, for example, several hundreds of thousands more of cases in the case of an image or several thousands of hours or more in the case of a video is assumed.

The input device 102 is an input interface used to transfer a user operation to the image analysis device 105 such as a mouse, a keyboard, or a touch device. The display device 103 is an output interface such as a liquid crystal display (LCD), and used for display of an image analysis result of the image analysis device 105, an interactive operation with the user, and the like. The data storage device 104 is a storage that records an analysis result of the image analysis device 106, and used so that the analysis result is used by a higher-level application.

The image analysis device 105 is a device that detects an object region in an input image, and decides a parameter at the time of detection through scene determination using a similar image search. A similar image search method will be described later. A scene is a term describing a scene shown in an image, and refers to, for example, "indoor," "landscape," "downtown," and the like. In the present embodiment, the scene determination refers to searching a database for an image having an image feature quantity similar to an image feature quantity of an input image. In the present embodiment, since the parameter at the time of detection is decided from an image obtained as a result of search, it is unnecessary to convert a scene into a word. A detection target can be freely changed by the user registering a template image. A template image is a typical detection target image, and an object similar to the template image is detected through a detection process. The image analysis device 105 includes an image input unit 106, a user operation input unit 107, an image database 108, a similar image search unit 109, a detection parameter deciding unit 110, an arbitrary object detecting unit 111, an image registering unit 112, and a data output unit 113.

The image input unit 106 reads image/video data from the image/video storage device 101, and converts a format of the read image/video data into a data format used in the image analysis device 105. At this time, the video data is divided into a plurality of frame image data. The read data is transferred to the image registering unit 112 when the user registers a template, and transferred to the similar image search unit 109 when an analysis process is performed.

The user operation input unit 107 detects an operation of the input device 102 by the user, transfers a signal of the operation to the similar image search unit 109, the detection parameter deciding unit 110, and the image registering unit 112, and controls execution of processing of each unit or changes a parameter used in processing.

The image database 108 is a database that stores image data, a feature quantity of image data, and information and a feature quantity of an object. The similar image search unit 109, the arbitrary object detecting unit 111, and the image registering unit 112 access the image database 108, and perform a search/reading on registered data and a registration operation of new data. An image database structure will be described in detail later with reference to FIGS. 2A and 2B.

The similar image search unit 109 acquires an image that is visually similar to an input image from the image database 108. An image feature quantity extracted from an input image is used as a search query. The image feature quantity is indicated, for example, by a fixed length vector, and in a search process, an image that is close in a Euclidean distance between vectors is searched. Typically, the similar image search is an operation of transmitting a list of an ID and a similarity of a similar image, but the similar image search unit 108 reads information of an object included in a similar image from a database as well. The similar image search will be described in detail later with reference to FIG. 3.

The detection parameter deciding unit 110 decides a parameter used in an image recognition process of the arbitrary object detecting unit 111 from the information of the object included in the similar image obtained from the similar image search unit 109. Examples of the parameter include a size of an object that is desired to be detected and a position, a type, and a feature quantity of an image. The deciding of the parameter using the similar image will be described in detail later with reference to FIGS. 6 and 8. The image analysis device 105 may use the parameter decided by the detection parameter deciding unit 110, and may transfer estimated parameter candidates to the user through the data output unit 113 and receive a parameter to be used from the user through the user operation input unit 107.

Figure 4:
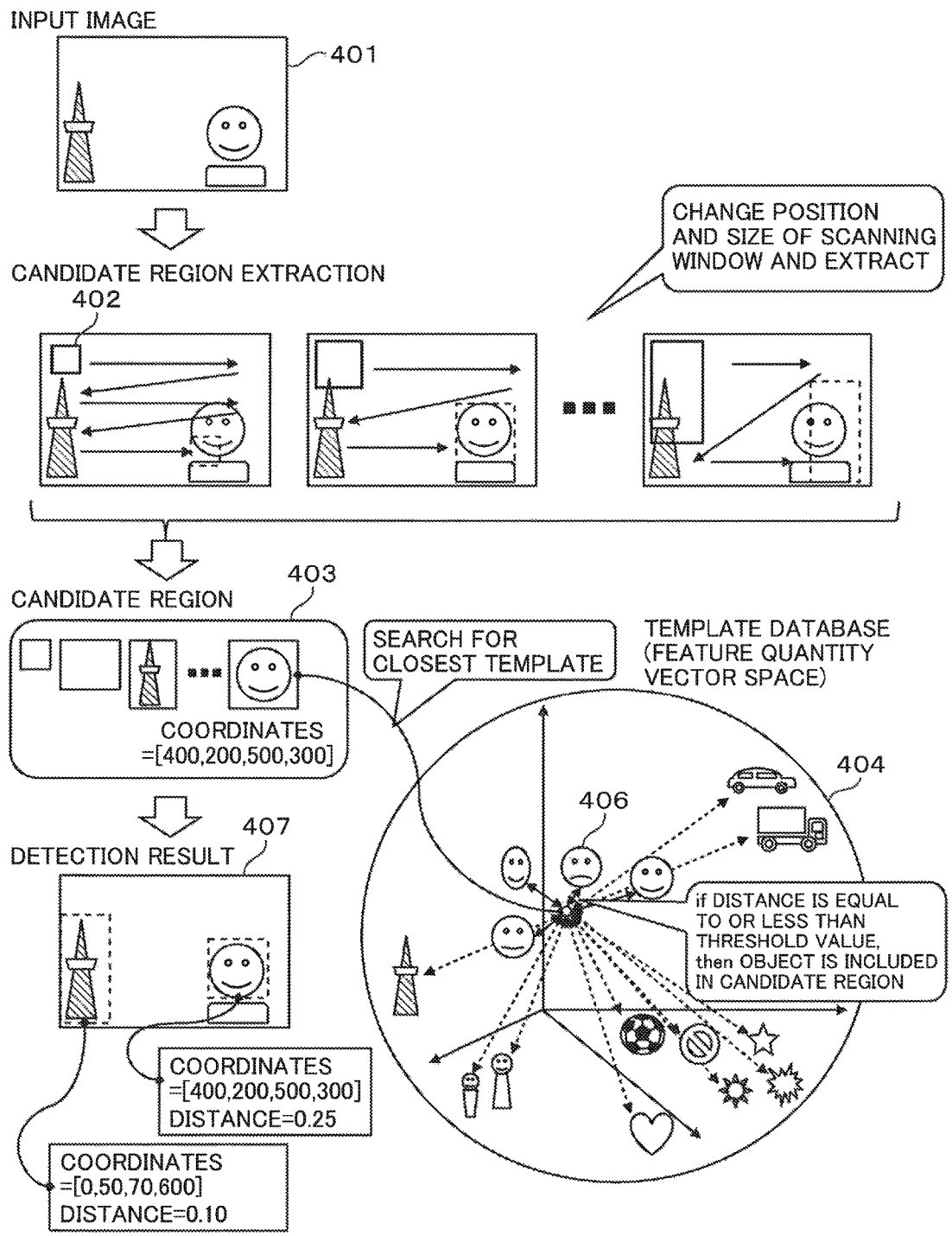
FIG. 4 is a diagram for describing a method of detecting an object in an image through an arbitrary object detecting unit 111.

The arbitrary object detecting unit 111 specifies coordinates of a region in which an object is located from an image through the image recognition process. An arbitrary object detection technique will be described in detail later with reference to FIG. 4. In the technique of FIG. 4, it is possible to flexibly change the detection target by changing the template image. Further, it is possible to set a plurality of categories (for example, a face of a person, a vehicle, a star mark, and the like) as the detection target simultaneously using a plurality of template images. The detection result is transferred to the image registering unit 112 and the data output unit 113 as coordinates of a circumscribed rectangle of an object (for example, [horizontal coordinates of the top left corner of the rectangle, vertical coordinates of the top left corner of the rectangle, horizontal coordinates of the bottom right corner of the rectangle, vertical coordinates of the bottom right corner of the rectangle]) and a degree of reliability indicating "objecthood."

The image analysis device 105 can invalidate the scene determination according to an instruction given from the user. When an instruction to invalidate the scene determination is given from the user operation input unit 107, processing of the similar image search unit 109 and processing of the detection parameter deciding unit 110 are skipped, and processing of the arbitrary object detecting unit 111 is executed.

The image registering unit 112 extracts an image feature quantity of the input image and an image feature quantity of an object detected by the arbitrary object detecting unit ill, and registers the extracted image feature quantities in the image database 108. It is unnecessary to extract the image feature quantity of the input image again when the image feature quantity of the input image has been extracted by the similar image search unit 109. Further, it is unnecessary to register all objects output from the arbitrary object detection 110, and only an object having a certain degree of reliability or higher may be registered, and a registration target may be decided by an interactive operation with the user. The registered image is used by the similar image search unit 109 and the arbitrary object detecting unit 111 when an image that is input subsequently is analyzed.

The data output unit 113 performs format/data conversion on the parameter obtained from the detection parameter deciding unit 110 and the information of the object detected by the arbitrary object detecting unit 111 as necessary, and outputs the conversion result to the display device 103 and the data storage device 104.

FIGS. 2A and 2B are diagrams illustrating a configuration and exemplary data of the image database 108. Here, an exemplary configuration of a table form is illustrated, but a data format may be arbitrary. The image database 108 includes an image table 200 and an object table 210, and registers an image and information of an object in an image in association with each other.

The image table 200 includes an image ID field 201, an image data field 202, an image feature quantity field 203, and an image size field 204. A field for holding bibliographic information (a categorization, a date and time, a place, and the like) may be added as necessary.

The image ID field 201 holds an identification number of each image data. The image data field 202 is a field in which image data is hold in a binary format, and used when the user checks an analysis result. The image feature quantity field 203 holds image feature quantity data. The image feature quantity is numerical value vector data having a fixed length by digitizing a feature of an image such as a color or a shape. A plurality of image feature quantity fields may be prepared, and for example, a shape feature quantity and a color feature may be managed in separate fields. The image size field 204 holds a size of an image. For example, a size of an image is indicated by a two-dimensional (2D) vector [the number of pixels in the horizontal direction, and the number of pixels in the vertical direction]. In FIGS. 2A and 2B, an example in which all images have the same size is illustrated, but images may have different sizes. When images have different sizes, a normalization process which will be described later is performed.

The object table 210 includes an object ID field 211, an image ID field 212, a region coordinate field 213, and an image feature quantity field 214. A field for holding a category (a label indicating an abstract concept such as a person, a mark, or a vehicle) of an object may be added as necessary.

The object ID field 211 holds an identification number of each image data. The image ID field 212 holds an ID of an image in which an object is shown. An ID managed in the image table 200 is used as the image ID. The region coordinate field 213 holds information of a circumscribed rectangle of an object. The information of the circumscribed rectangle is indicated, for example, by a four-dimensional (4D) vector [horizontal coordinates of the top left corner of the rectangle, vertical coordinates of the top left corner of the rectangle, horizontal coordinates of the bottom right corner of the rectangle, and vertical coordinates of the bottom right corner of the rectangle]. The image feature quantity field 214 holds image feature quantity data of an object region. The image feature quantity of the object region need not be necessarily calculated by the same algorithm as a feature quantity of an entire image.

A field for holding an object ID list may be added to the image table 200 in order to read information of an object included in an image at a high speed.

<Operation of Each Component>

An overall configuration of the image analysis system 100 has been described above. Hereinafter, an operation principle of the image analysis system 100 is generally described, and then a detailed operation of each functioning unit will be described.

(Description of Similar Image Search)

FIG. 3 illustrates an example of an image feature quantity extraction process used in the image analysis system 100. In the present technique, first, images of a plurality of resolutions are generated from an input image. Then, an image of each resolution is divided into regions. The number of characteristic edge patterns included in each region is counted to generate a histogram, and this is converted into a multi-dimensional vector. Normalization for correcting a distribution deviation of each pattern is performed, dimension compression is performed on an obtained several thousand-dimensional vector by principal component analysis or the like, and result data is stored, for example, as several hundred-dimensional fixed length vector data that is easily dealt by a system. The obtained vector data becomes close values between visually similar images and can be used for the similar image search. Further, any other feature quantity which is widely known to the public such as an edge histogram feature specified in MPEG-7 may be used as long as it is vector data indicating a visual feature of an image.

The similar image search is a process of searching for similar data by evaluating similarity between image feature quantity vectors. A dissimilarity d between two n-dimensional vectors X and Y can be obtained by the square of the Euclidean distance, for example, as in Formula 1. Xi and Yi are i-th elements of the vector X and the vector Y.

$$d = \sum_{i}^{n} (X_i - Y_i)^2 \qquad \text{Formula 1}$$

In order to obtain a similar image, specifically, a dissimilarity with a feature quantity of a query image may be obtained on all images in a database using Formula 1, and the images may be sorted in the ascending order of dissimilarity and output. However, since a processing time increases linearly according to a data amount, it is difficult to search a large-scaled database. In this regard, a clustering process of generating a group in which similar data is collected in advance is performed in advance. For example, a K-means technique is known as a clustering technique. In the K-means technique, a data set is automatically divided into K clusters (K is a given number of cluster) using a mean value of a cluster. At the time of search, first, distances of clusters with an average vector are obtained, and a similarity evaluation is performed on only images belonging to a cluster having a close distance. Using a clustered database, it is possible to implement a high-speed similar image search on a large-scaled database. For example, a process of searching for 1,000 similar images from 4M image databases using a 200-dimensional feature quantity can be performed in about 10 milliseconds even when a general PC server is used.

According to the above-described process, when it is a feature quantity expression of a fixed length vector indicating a visual feature of an image, it is possible to implement the similar image search regardless of a used feature quantity, but it is necessary to extract feature quantities of a database image and a query image through the same algorithm.

(Description of Arbitrary Object Detection)

FIG. 4 is a diagram for describing an exemplary object region detection method in the arbitrary object detecting unit 111. According to the present technique, a plurality of template images of an object that is desired to be detected are prepared, a region visually similar to any one template is searched, and a region in which there is an object in an image is detected.

First, an image feature quantity of a template image of an object that is desired to be detected is extracted and stored in a template database 404 in advance. For example, when it is desired to detect a plurality of objects, the template database 404 can hold a plurality of templates (images of a detection object) corresponding to the respective objects. In the image analysis system 100, the feature quantity of the template refers to a feature quantity of an object accumulated in the image database 108. When the analysis process is performed, for the sake of an efficient process, a feature quantity of an object is read from the image database 108 in advance and stored in a memory of a computer as a template database.

When an input image 401 is given, the arbitrary object detecting unit 111 changes the position or the size of a scanning window 402, and extracts a candidate region 403 of an object. When there is no limitation on photographing condition of an image, a relative size of an object in an image is not fixed, and thus it is necessary to extract a large amount of candidate regions using various sizes of operation windows as illustrated in FIG. 4.

Then, a process of searching for a template (a closest template) whose feature quantity vector is closest to the feature quantity vector of the candidate region 403 from among a plurality of templates in the template database 404 is performed on all the candidate regions 403. When the distance of the closest template is equal to or less than a certain threshold value, the candidate region 403 is determined to include the object of the template, and the candidate region 403 is added to the detection result. A detection result 407 is output together with a list of coordinates of the object region and the distance with the closest template. At this time, the distance with the closest template may be used as a degree of reliability of the detection result.

The closest template search process is delayed according to the number of templates registered in the template database 404. As described above in the description of the similar image search, when the feature quantity vector clustering process is executed in advance, it is possible to suppress a speed deterioration associated with an increase in the number of templates to some extent, but in order to increase the speed, it is desirable to reduce the number of templates to be compared as much as possible.

Figure 5:
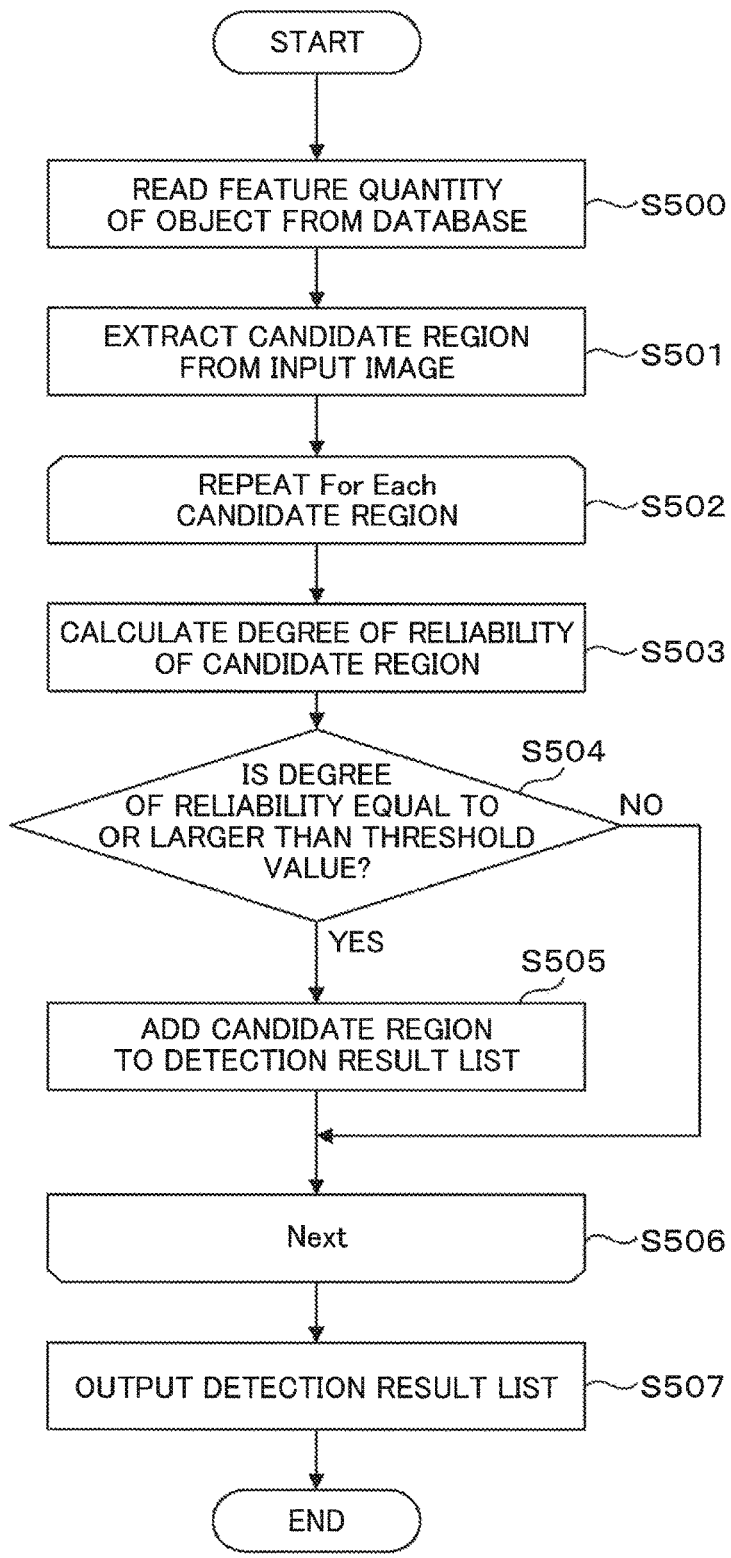
FIG. 5 is a flowchart for describing a processing procedure of detecting an object in an image through the arbitrary object detecting unit 111.

FIG. 5 is a flowchart for describing a process of detecting an object through the arbitrary object detecting unit 111. Hereinafter, respective steps of FIG. 5 will be described.

(FIG. 5: Step S500)

The arbitrary object detecting unit 111 reads a feature quantity of an object designated as a template by the user from the image database 108, and causes the read feature quantity to be held in a memory as a template database. When the detection process is performed on a plurality of input images under the same condition, the present step is preferably performed only once.

(FIG. 5: Step S501)

The arbitrary object detecting unit 111 extracts the candidate region 403 in the input image 401. The candidate region 403 is mechanically extracted by shifting the scanning window for each step or changing the size.

(FIG. 5: Steps S502 to S506)

The arbitrary object detecting unit 111 performs step S502 to step S506 on all the candidate regions 403.

(FIG. 5: Step S503)

The arbitrary object detecting unit 111 calculates a degree of reliability of the candidate region 403. As a degree of reliability calculation method, for example, a distance between the feature quantity of the closest template and the feature quantity of the candidate region 403 may be used as described above with reference to FIG. 4.

(FIG. 5: Steps S504 to S505)

When the degree of reliability of the candidate region 403 calculated in step S503 is equal to or less than a certain threshold value, the process proceeds to step S505, and step S505 is skipped otherwise (S504). The arbitrary object detecting unit 111 adds the candidate region 403 whose degree of reliability is the certain threshold value to the detection result list (S505).

(FIG. 5: Step S507)

The arbitrary object detecting unit 111 outputs the detection result list, and ends the present process flow. The detection result is output as a set of coordinate information (for example, [horizontal coordinates of the top left corner of the rectangle, vertical coordinates of the top left corner of the rectangle, horizontal coordinates of the bottom right corner of the rectangle, and vertical coordinates of the bottom right corner of the rectangle]) in the input image 401 and the degree of reliability.

The technique of FIG. 4 is very high in a computation cost since it is necessary to perform the closest template search intended for all templates on candidate regions of all sizes when there is no information (for example, a fixed camera video obtained by photographing a specific point) serving as previous knowledge on an input image.

For example, an average processing time is about 600 milliseconds when a common PC server is used under a condition in which an object having a horizontal width 32 or larger and a vertical width 32 or larger is detected from an image having a horizontal width 640 and a vertical width 480 using 10,000 templates. A practical problem occurs when a real time response is necessary as in analysis of a monitoring video or when it is intended for a large amount of image data continuously accumulated in a storage.

Further, in terms of accuracy, since determination using a visual feature of an image is performed, a region having a small size and an unstable feature is likely to be a cause of erroneous detection.

In this regard, in the present system, an efficient detection process is implemented by determining a scene of an input image automatically using an accumulated image and information of an object and estimating a detection parameter adaptive to a scene.

Figure 6:
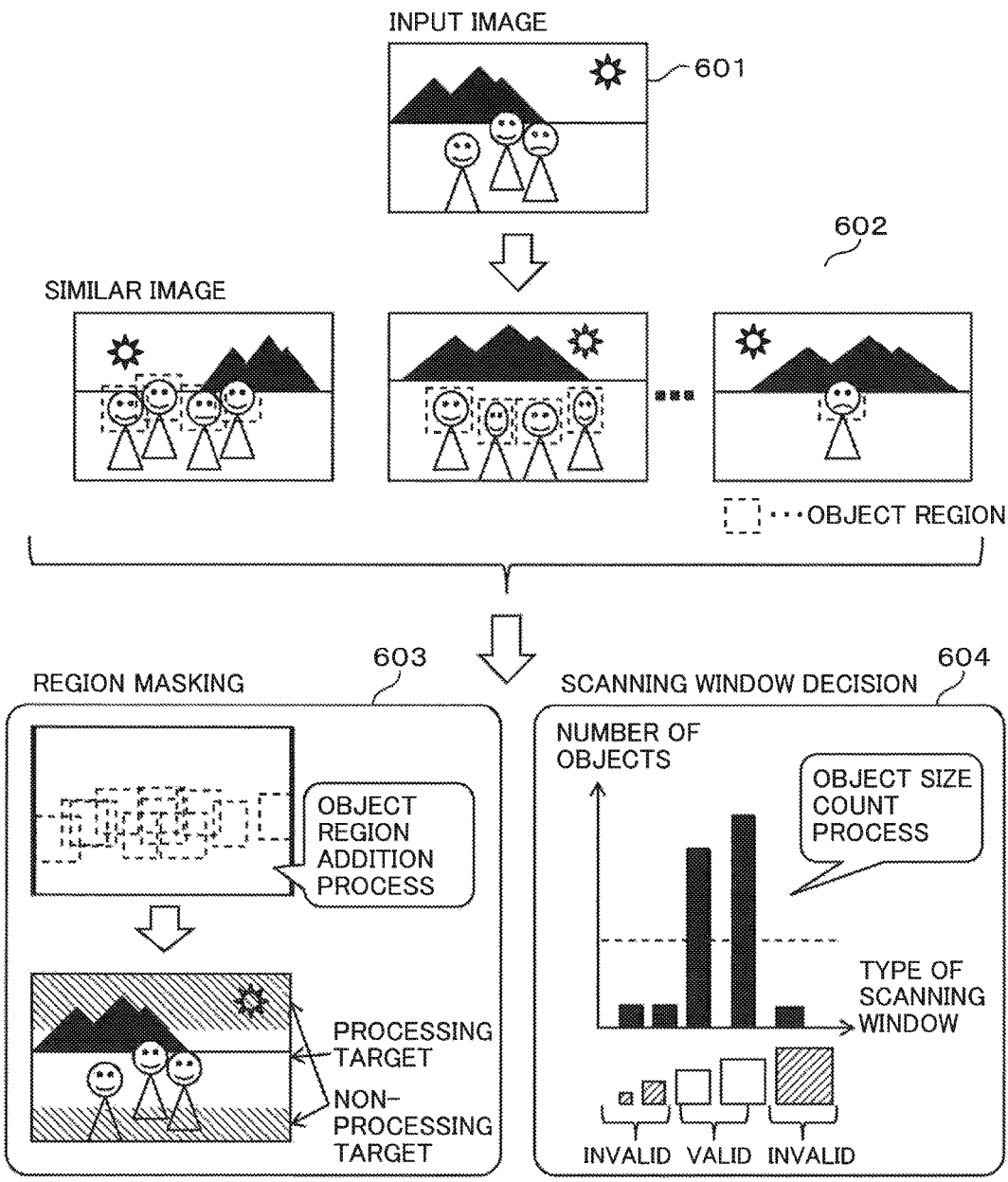
FIG. 6 is a diagram for describing a method of deciding a parameter used in an object detection process using scene determination through a detection parameter deciding unit 110.

FIG. 6 is a diagram for describing a detection parameter decision method using scene determination. In the present technique, first, a similar image search using the input image 601 as a query is performed, and an image 602 similar to a visual feature of an image is acquired from the image database 108. The feature quantity extraction method and the similar image search method have been described above with reference to FIG. 3.

In a normal similar image search, a similar image and a similarity thereof are output, but in the image analysis system 100 of the present embodiment, an image in which an object has been detected previously is accumulated in the image database 108, and thus it is possible to acquire the similar image 602 and a position and a size of an object included in the similar image 602 together. In FIG. 6, a dotted line rectangle of the similar image 602 indicates a position of an object.

When the similar image 602 is obtained, the detection parameter deciding unit 110 performs a region masking process 603 of masking a region serving as a detection process target and a scanning window type decision process 604 based on the information of the object included in the similar image 602.

In the region masking process 603, a region addition process is performed by projecting a region of an object included in each similar image on two-dimensional coordinates. At this time, since there is a size difference between images, normalization of coordinates is performed. When a sufficient number of images are accumulated in the image database 108, and a number of similar images 602 are obtained, it is preferable to obtain an overlapping region simply and set a location at which an object is positioned in a similar image as a detection process target region. When the number of similar images is small, for example, the detection target region may be enlarged to be larger than the object region by approximating each object region by the Gaussian distribution.

In the scanning window decision process 604, the number of appearances is counted for each object rectangle, and a rectangle having a size in which the number of appearances is equal to or larger than a certain threshold value is used as the scanning window. At this time, the counting is performed under the assumption that similar rectangles are the same. For example, a rectangle of 32×32 pixels and a rectangle of 32×30 pixels are assumed to be the same.

As described above, it is possible to reduce a processing load related to object detection by limiting the detection target region of an input image undergoing the object detection and the size of the scanning window to some extent based on the information of the object in the similar image 602.

FIG. 7 is a flowchart illustrating a processing procedure of performing the object detection using the scene determination through the image analysis device 105. Hereinafter, respective steps of FIG. 7 will be described.

(FIG. 7: Step S701)

The image input unit 106 reads image data from the image/video storage device 101, and converts a format of the read image data into a data format usable in the device. In the case of video data, the image data is divided into a plurality of frame images, and each frame image is processed in the subsequent steps.

(FIG. 7: Step S702)

The user operation input unit 107 receives a result of determining whether or not the scene determination process is performed from the user, and when the scene determination process is performed, the process proceeds to step S703, and when the scene determination process is not performed, steps S703 to S705 are skipped, and the process proceeds to step S706.

(FIG. 7: Step S703)

The similar image search unit 109 performs the similar image search on the image database 108 using the input image read in step S701 as a query, and obtains a list of an ID and similarity of a similar image.

(FIG. 7: Step S704)

The similar image search unit 109 reads information of an object (a position and a size of an object occupying in an image) included in the similar image from the image database 108 based on the ID of the similar image.

(FIG. 7: Step S705)

The detection parameter deciding unit 110 decides a parameter used for object detection using the information of the object included in the similar image. The parameter decision method decides a region serving as the analysis target or a type of the scanning window as described above with reference to FIG. 6.

(FIG. 7: Step S706)

The arbitrary object detecting unit 111 detects an arbitrary object region from the input image according to the decided detection parameter. The example and the procedure of the detection method have been described above with reference to FIG. 4 and FIG. 5. When the scene determination is not performed, the search is performed comprehensively without narrowing the parameter down.

(FIG. 7: Step S707)

The image registering unit 112 receives an instruction indicating whether or not the detection result is accumulated in the database from the user operation input unit 107, performs step S708 when the detection result is accumulated, and skips step S708 when the detection result is not accumulated.

(FIG. 7: Step S708)

The image registering unit 112 registers the input image and the detected object in the image database 108 in association with each other. For the input image, the feature quantity used in the similar image search process by the similar image search unit 109 is extracted, and for the object region, the feature quantity used in the object detection process by the arbitrary object detecting unit 111 is extracted.

(FIG. 7: Step S709)

The data output unit 113 outputs the detection result to an external device, and then the present process flow ends. Depending on an application, the detection result may be displayed on the display device 103 or may be output to the data storage device 104.

Figure 8:
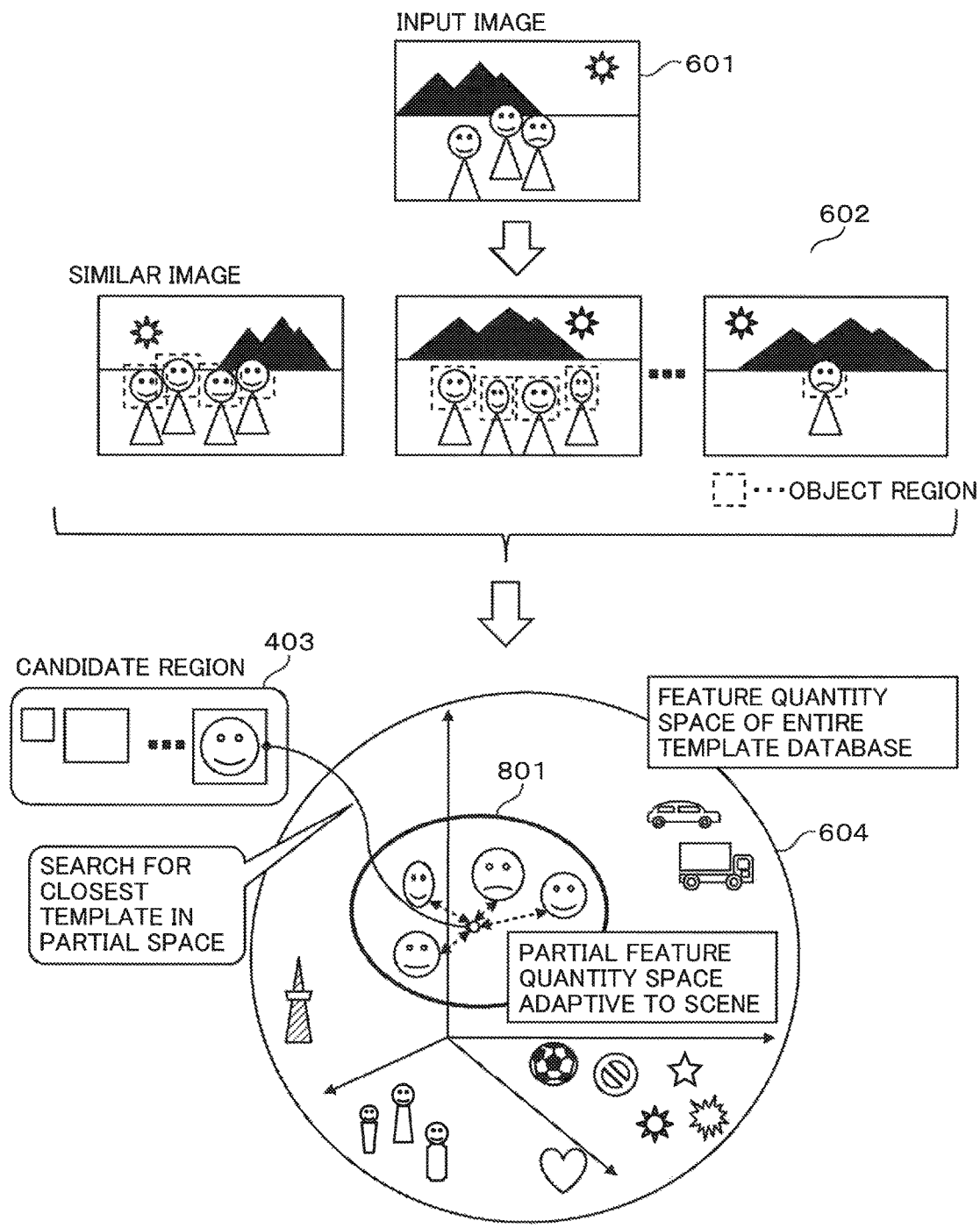
FIG. 8 is a diagram for describing a method of deciding a template used in an object detection process using scene determination through the detection parameter deciding unit 110.

FIG. 8 is a diagram for describing a detection target narrowing-down process using the scene determination. In the present technique, similarly to FIG. 6, the similar image search using the input image 601 as the query is performed, and the image 602 similar to an overall look of an image is acquired from the image database 108.

When the similar image 602 is acquired, the detection parameter deciding unit 110 acquires an ID of an object included in the similar image 602, and transfers an object ID list to the arbitrary object detecting unit 111.

The arbitrary object detecting unit 111 extracts candidate regions from the input image, performs a distance calculation with the images in the template database on the candidate regions, and obtains the closest template as described above with reference to FIG. 4. Here, a template to be used corresponds to a feature quantity of an object registered in the image database 108. Thus, it is possible to limiting a template to be used by designating an ID of an object.

In this regard, in the present technique, a distance with only the object in the similar image 602 is calculated by using the object ID list transmitted from the detection parameter deciding unit 110 and setting the object included in the list as a template. Conceptually, a partial feature quantity space 801 adaptive to the scene is clipped from a feature quantity space 604 of an entire template database and used for determination of the candidate region 403 as illustrated in FIG. 8.

At this time, an object similar to each object as well as an object included in the similar image 602 may be acquired to increase the number of templates. Further, when category information of an object is included in the object table 210 of the image database 108, objects of the same category may be added to the template.

In the method of FIG. 4, since it is necessary to calculate a distance with all templates in order to obtain the closest template, the processing speed deteriorates according to the number of templates. On the other hand, in the technique of FIG. 8, it is possible to limit the number of templates according to a scene, and thus a high-speed process is possible. Further, in the present technique, an effect in which erroneous detection of an object is prevented can be expected as well. For example, when an air photograph is input, if a template of a face is used, a region of terrain similar to a pattern of a face is likely to be erroneously detected. It is possible to remove a template inappropriate for a scene by implicitly giving information indicating "there is no case in which there is a face among air photographs" in advance through the scene determination.

Figure 9:
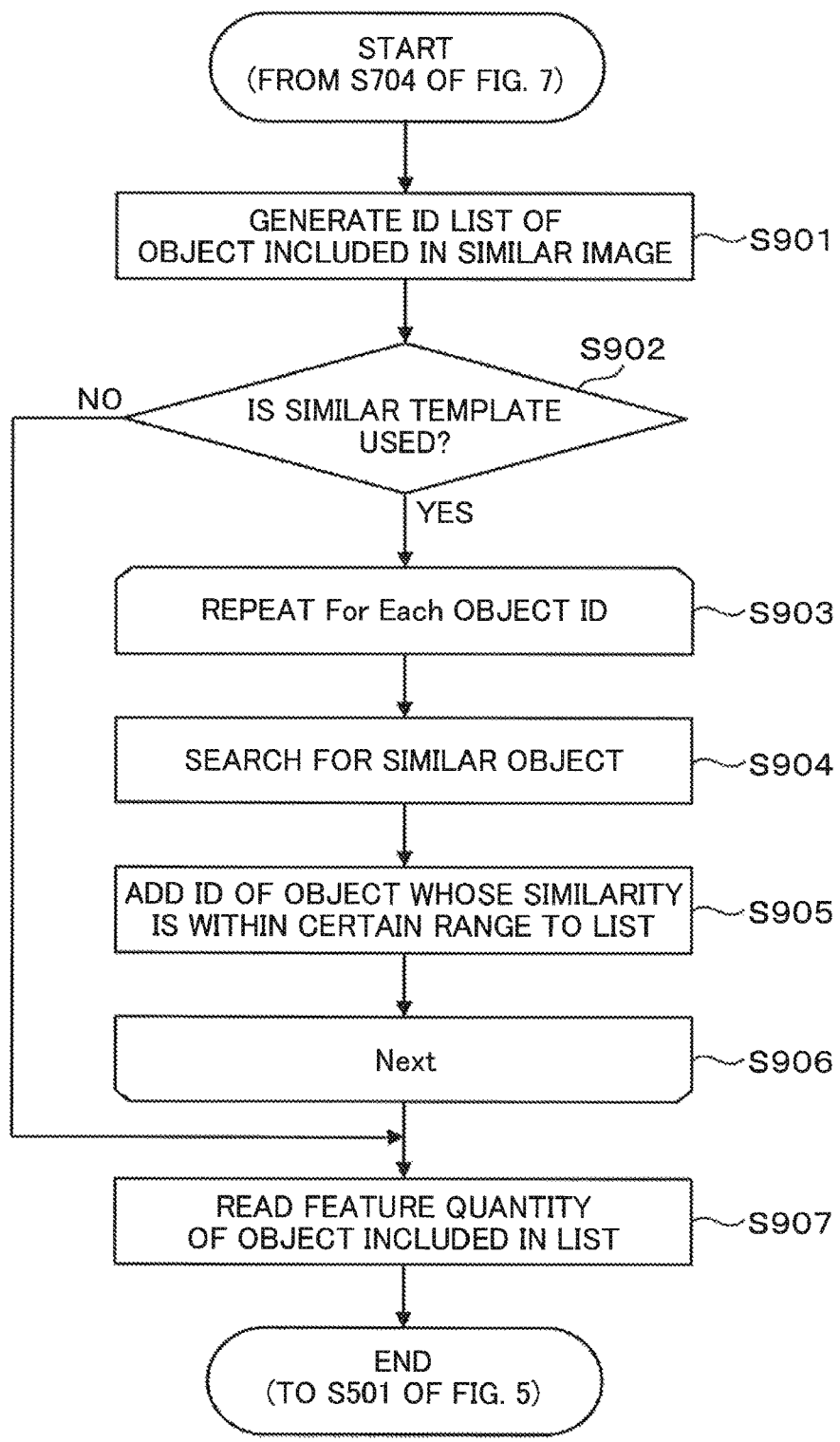
FIG. 9 is a flowchart for describing a process of deciding a template used in an object detection process using scene determination through the detection parameter deciding unit 110.

FIG. 9 is a flowchart illustrating a processing procedure of narrowing down a detection target using the scene determination through the image analysis device 105. The present process is a process added to the detection parameter decision process of step S705 of FIG. 7, and the scene determination process using the similar image search is similar to steps 703 and S704 of FIG. 7.

Hereinafter, respective steps of FIG. 9 will be described.

(FIG. 9: Start (Steps S703 and S704 of FIG. 7))

The similar image search unit 109 acquires an image similar to an input image from the image database 108, and acquires an ID of an object included in the similar image based on an ID of each similar image.

(FIG. 9: Step S901)

The detection parameter deciding unit 110 generates a list of IDs of objects included in the similar images.

(FIG. 9: Step S902)

The user operation input unit 107 receives a result of determining whether or not a similar template is used from the user, the process of steps S902 to S906 is performed when the similar template is used, and the process proceeds to S907 when the similar template is not used.

(FIG. 9: Steps S903 to S906)

The detection parameter deciding unit 110 performs steps S903 to S906 on all object IDs included in the list generated in step S901.

(FIG. 9: Step S904)

The detection parameter deciding unit 110 designates an object ID, and acquires a similar object from the image database 108. The similar object search is a process of searching for a similar feature quantity vector, similarly to the similar image search using the input image as the query. Since the feature quantity of the object region has been registered in the image database 108, it is unnecessary to extract the feature quantity again, and only a feature quantity comparison process is performed.

(FIG. 9: Step S905)

The detection parameter deciding unit 110 adds an object whose similarity falls within a certain range based on the search result to the list. If the category information of the object is included in the object table 210 of the image database 108, steps S904 and S905 may be replaced with a process of searching for objects of the same category and adding the searched objects to the list.

(FIG. 9: Step S907)

The arbitrary object detecting unit 111 reads the feature quantity of the object included in the list from the image database, and sets the read feature quantity as the template database. Step S907 is a process of replacing step S500 of FIG. 5.

Figure 10:
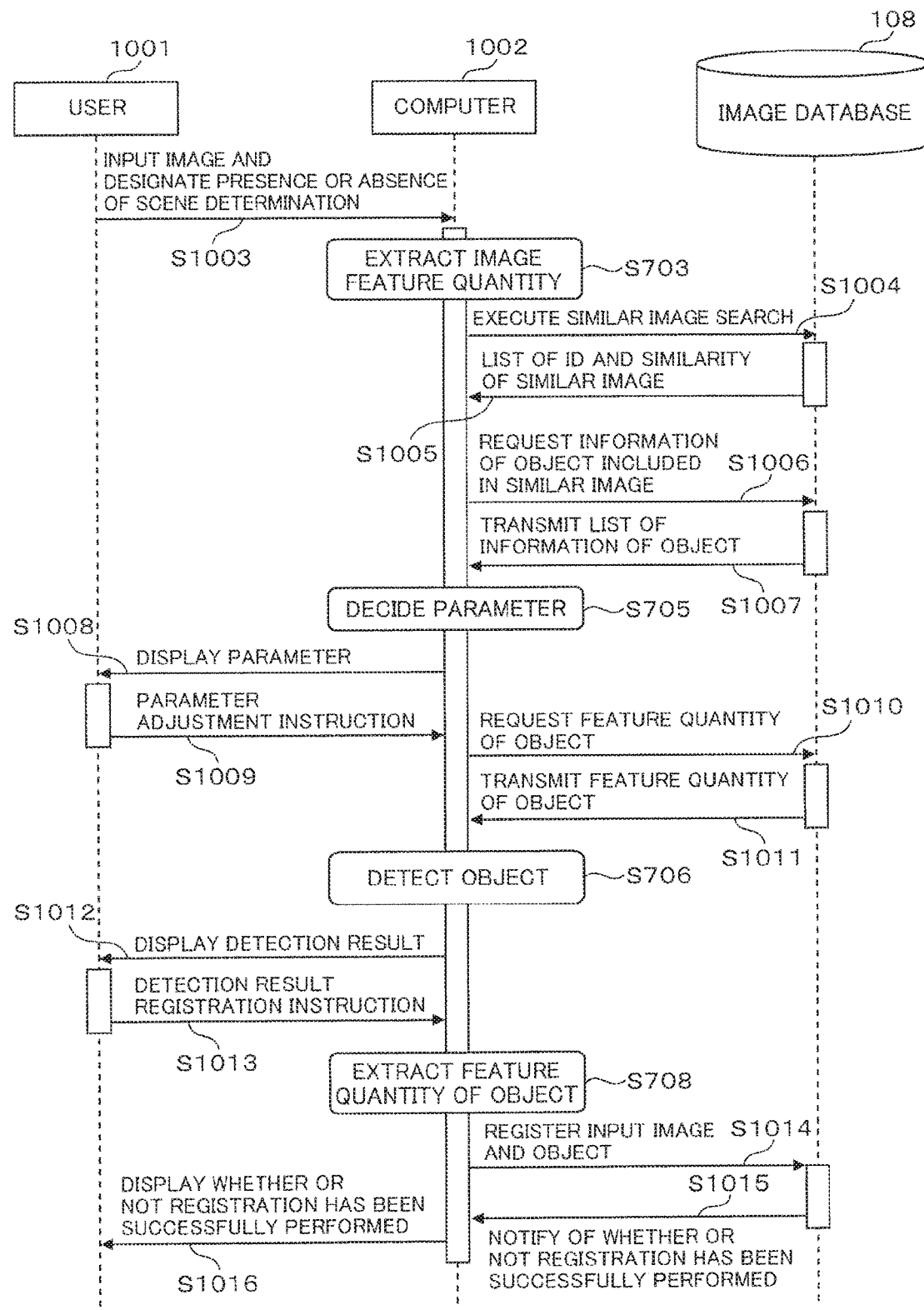
FIG. 10 is a diagram for describing a processing sequence among functioning units in a process of detecting an object in an image using scene determination through the image analysis system 100.

FIG. 10 is a diagram for describing a processing sequence of a user 1001, a computer 1002, and the image database 108 in a process in which the image analysis system 100 specifies an object region in an image. Hereinafter, respective steps of FIG. 10 will be described.

[Scene Determination Process] (FIG. 10: Steps S1003 to S1005)

The user 1001 selects an image that undergoes the object detection from the images being stored in the image/video storage device 101, and inputs information indicating the presence or absence of the scene determination to the computer 1002 through the input device 102 (S1003). The computer 1002 extracts a feature quantity from the input image in the similar image search unit 109 (S703), and requests the image database 108 to execute the similar image search using the feature quantity vector as a query (S1004). The image database 108 transmits a list of an ID and similarity of a similar image (S1005).

[Parameter Decision Process] (FIG. 10: Steps S1006 to S1009)

The computer 1002 requests the image database 108 to perform a bibliographic information search using an ID of a similar image as the query (S1006). The image database 108 transmits information of each object in a list form (S1007). The computer 1002 decides a parameter and a template that are used for object detection in the detection parameter deciding unit 110 (S705). The computer 1002 transmits the parameter to the user 1001 through the display device 103 (S1008). The user 1001 checks the parameter presented from the computer, and transmits a parameter adjustment instruction to the computer 1002 through the input device 102, if necessary (S1009).

[Object Detection Process] (FIG. 10: Steps S1010 to S1012)

The computer 1002 designates an object ID list in the arbitrary object detecting unit 111, and requests the image database 108 to transmit a feature quantity of an object to be used as a template (S1010). The image database 108 transmits the feature quantity of the object included in the list to the computer 1002 (51011). The computer 1002 detects a region of the object from the input image using the acquired template database (S706). The detection result is presented to the user 1001 through the display device 103 (S1012).

[Registration Process] (FIG. 10: Steps S1013 to S1016)

The user 1001 checks the displayed search result, and gives a registration instruction to the computer 1002 (S1013). The computer 1002 extracts an image feature quantity of the object region of the input image in the image registering unit 112 (S708). The image registering unit 112 registers the input image, the feature quantity of the input image, the information of the object, and the feature quantity of the object in the image database 108 in association with one another (S1014). The image database 108 transmits information indicating whether or not the registration has been successfully performed to the computer 1002 (S1015), and the computer 1002 presents the user with the result through the display device 103 (S1016).

As described above, the image analysis device 105 can increase the number of templates by registering the detected object in the image database 108 and thus improve the recognition accuracy. However, in an initial state, when no image is registered in the image database 108, it is difficult to detect an object. For this reason, when a system is introduced, it is necessary to register a template by hands. Further, even when it is desired to detect an object of a new category at the time of operation, a template addition process is necessary.

Figure 11:
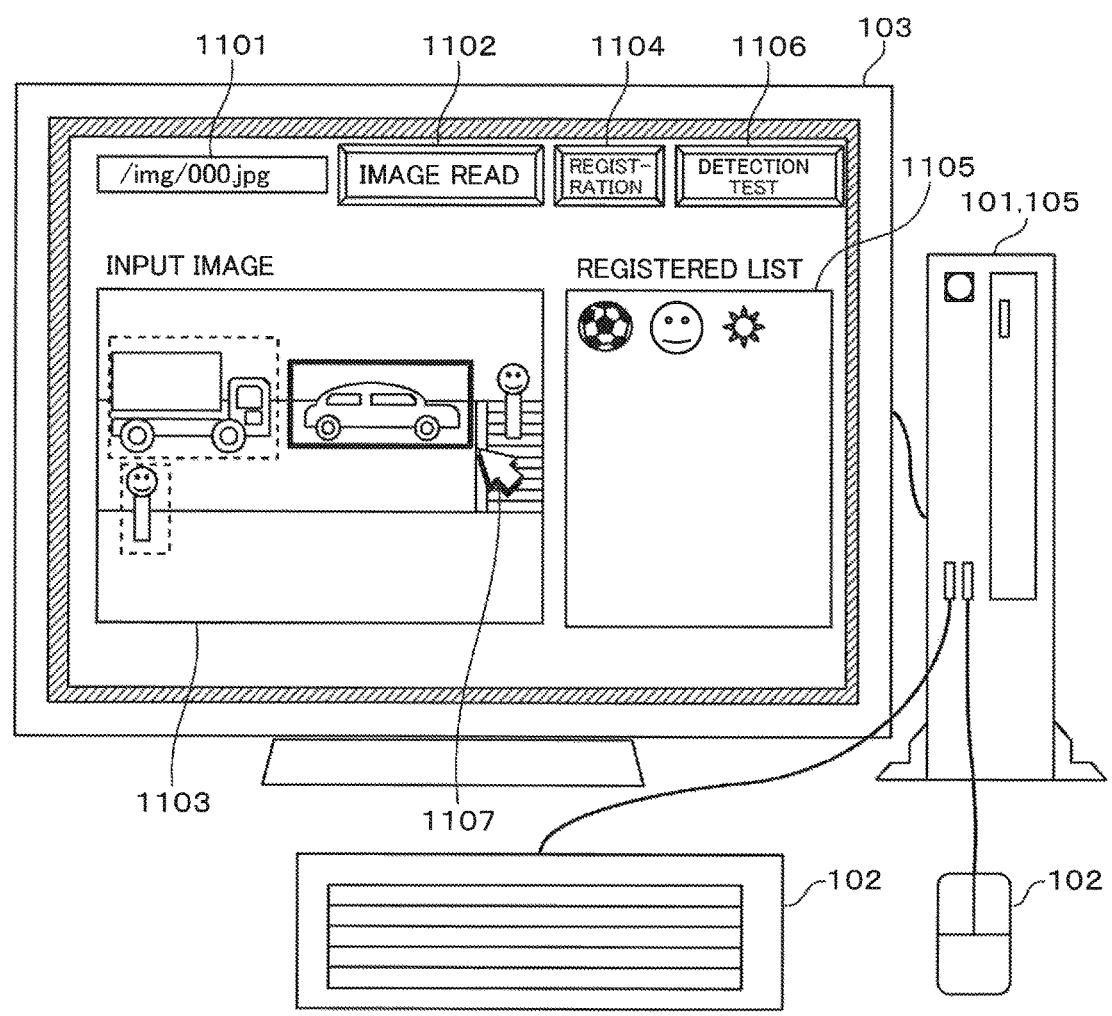
FIG. 11 is a diagram illustrating an exemplary configuration of an operation screen used to register a template to be used by the arbitrary object detecting unit ill.

FIG. 11 is a diagram illustrating an exemplary configuration of an operation screen used when data is newly added to the image database 108. The present screen can be provided on the display device 103. The user transmits operation information to the user operation input unit 107 by operating a cursor 1107 displayed on the screen using the input device 102.

The operation screen of FIG. 11 includes a file path input region 1101, an image read button 1102, an image display region 1103, an image registration button 1104, a registered object display region 1105, and a detection test button 1106.

First, the user inputs a file path of an image stored in the image/video storage device 101 to the file path input region 1101, and clicks the image read button 1102. For example, as the input method, a dialogue designating a file path of a file system may be used, or an intuitive input operation by drag and drop may be used. The read image is displayed on the image display region 1103.

Then, the cursor 1107 is operated to designate a circumscribed rectangle of an object in the image displayed on the image display region 1103. When a plurality of objects are included in the image, this operation is repeatedly performed. In FIG. 11, a selected object is indicated by a dotted line rectangle, and an object being selected is indicated by a rectangle of a thick frame.

After all objects included in the image are selected, the image registration button 1104 is clicked. As a result, the input image and the rectangle information of the object region are transmitted to the image analysis device 105. The transmitted data is registered in the image database 108 through the image registering unit 112.

The registered data is displayed on the registered object display region 1105. A function of selecting the registered object and then deleting the object or displaying an image of a scene associated with the object may be added. Further, it is possible to test the object detection in which the registered object is set as the template by clicking the detection test button 110.

When the objects are sufficiently registered in the image database 108, the image analysis device 105 can automatically detect an object similar to registered data from a given image.

Figure 12:
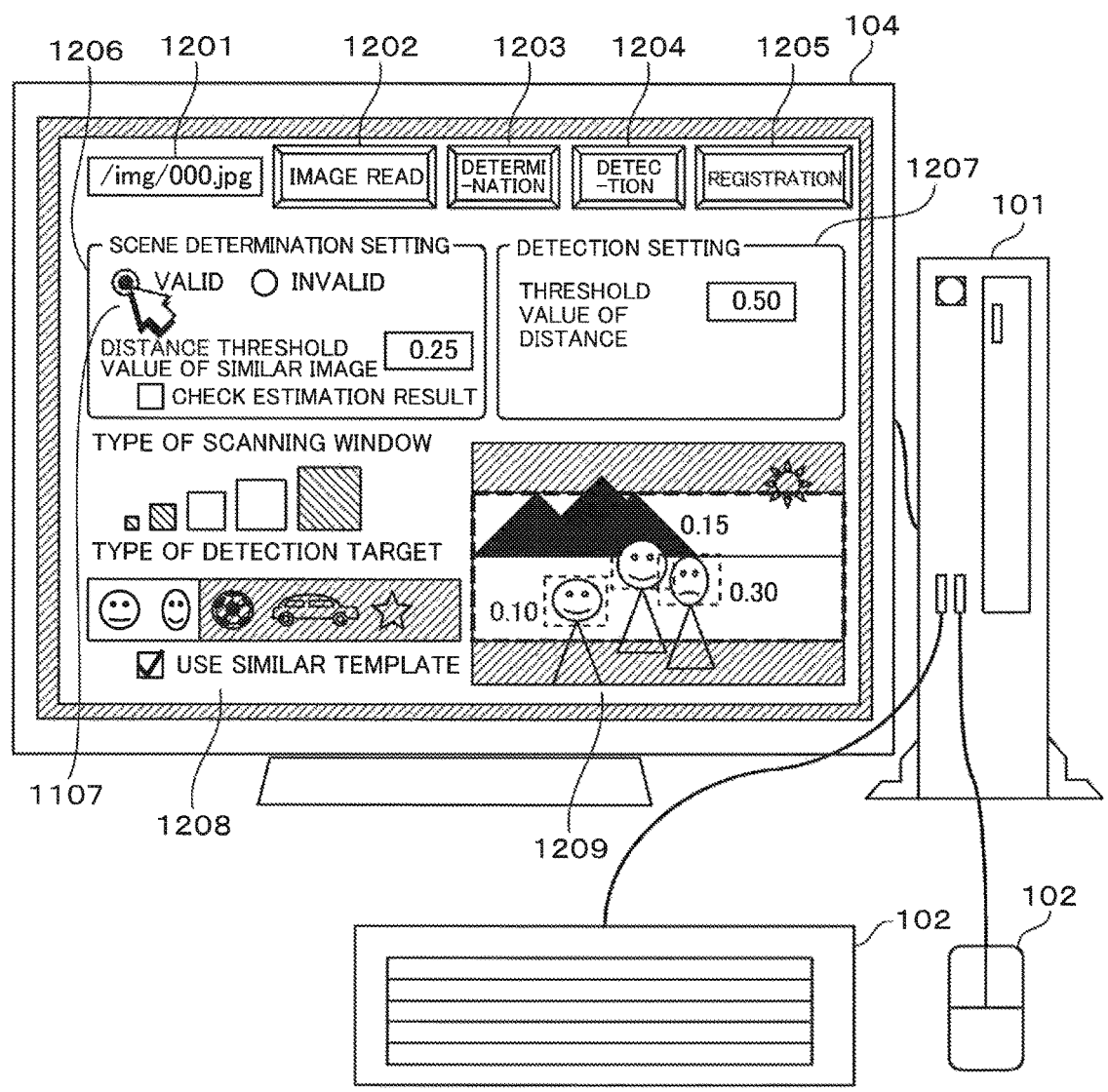
FIG. 12 is a diagram illustrating an exemplary configuration of an operation screen used to control an object detection process using scene determination.

FIG. 12 is a diagram illustrating an exemplary configuration of an operation screen used to execute the object detection. The present screen can be provided on the display device 103. The user transmits operation information to the user operation input unit 107 by operating the cursor 1107 displayed on the screen using the input device 102.

The operation screen of FIG. 12 includes a file path input region 1201, an image read button 1202, a scene determination button 1203, an object detection button 1204, a detection result registration button 1205, a scene determination setting field 1206, an object detection setting field 1207, a detection parameter display field 1208, and an image display region 1209.

First, the user inputs a file path of an image stored in the image/video storage device 101 to the file path input region 1201, and clicks the image read button 1202. For example, as the input method, a dialogue designating a file path of a file system may be used, or an intuitive input operation by drag and drop may be used. The read image is displayed on the image display region 1209.

Then, a parameter related to the scene determination process is input to the system using the scene determination setting field 1206. The scene determination setting field 1206 includes, for example, a radio button for designating whether or not the scene determination process is performed, a field for designating a threshold value of a distance of a similar image used for the scene determination, and a check box for designating whether or not an estimation result is displayed on the screen. A similarity s has a value that increases as the distance in the feature quantity space decreases. For example, when the similarity s is calculated by Formula 2, a similarity s has a real number value having a range of 0 to 1, and a similarity between a template and an object can be interpreted to increase as s increases. Here, e is the base of natural logarithm.

$$s=e^{-d} \qquad \text{Formula 2}$$

When the user clicks the scene determination button 1203, an input setting is transferred to the similar image search unit 109 and the detection parameter deciding unit 110 through the user operation input unit 107, and a detection parameter estimation process by the scene determination is executed. The estimated parameter is displayed on the detection parameter display unit 1208 and the image display region 1209. For example, parameters/templates that are not used for the type of the scanning window and the type of the detection target in the screen are displayed in gray. Further, in the image display region 1209, a region other than the detection process target is displayed in gray. The user can check the presented parameter and adjust the parameter. Further, a threshold value of a distance with the closest template is input in the object detection setting field 1207.

When the user clicks the object detection button 1204, the arbitrary object detecting unit 111 detects an object in an image using the estimated parameter. The detection result is displayed on the image display region 1209 as the circumscribed rectangle of the object in a superimposed manner. In addition to the rectangle, a numerical value of a degree of non-reliability may be displayed.

When the user clicks the detection result registration button 1205, the object detected by the above operation is registered in the image database 108.

The screen example of FIG. 12 is a screen used to sequentially execute the respective processes of the image analysis device 105 while checking the respective processes of the image analysis device 105, and when a large amount of images are processed, a screen in which a click operation of each button is omitted, and batch execution is performed is used.

Therefore, an image analysis device according to the present embodiment includes an image storage unit that stores an image and information of a detected object included in the image, an image input unit that receives a target image serving as a target in which an object is detected, a similar image search unit that searches for a similar image having a feature quantity similar to a feature quantity extracted from the target image and the information of the detected object included in the similar image from the image storage unit, a parameter deciding unit that decides a parameter used in a detection process performed on the target image based on the information of the detected object included in the similar image, a detecting unit that detects an object from the target image according to the decided parameter, an image registering unit that accumulates the detected object and the target image in the image storage unit, and a data output unit that outputs the information of the detected object.

Further, an image analysis method according to the present embodiment is an image analysis method of detecting an object from an input target image, and includes an extraction step of extracting a feature quantity of the target image, a search step of searching for a similar image having a feature quantity similar to the extracted feature quantity of the target image from the image storage unit, a decision step of deciding a parameter used in a detection process on the target image based on information of a detected object included in the searched similar image, a detection step of performing a detection process on the target image based on the decided parameter to detect an object, a step of outputting the object detected from the target image, and a storage step of storing the target image and the detected object in the image storage unit.

According to a relevant feature, it is possible to reduce the processing load and the processing time by performing the similar image search using the input image that undergoes the object detection and deciding the parameter of the object detection based on the accumulated similar image that has undergone the object detection.

Second Embodiment

The first embodiment has been described in connection with the operation when one image is input to the image analysis device 105. On the other hand, the image analysis system 100 of the present invention is intended for analyzing a large amount of images accumulated in the image/video storage device 101, and can implement an efficient process by processing a large amount of images collectively. Hereinafter, in the present embodiment, a processing procedure when a large amount of input images are set as an analysis target will be described.

Figure 13:
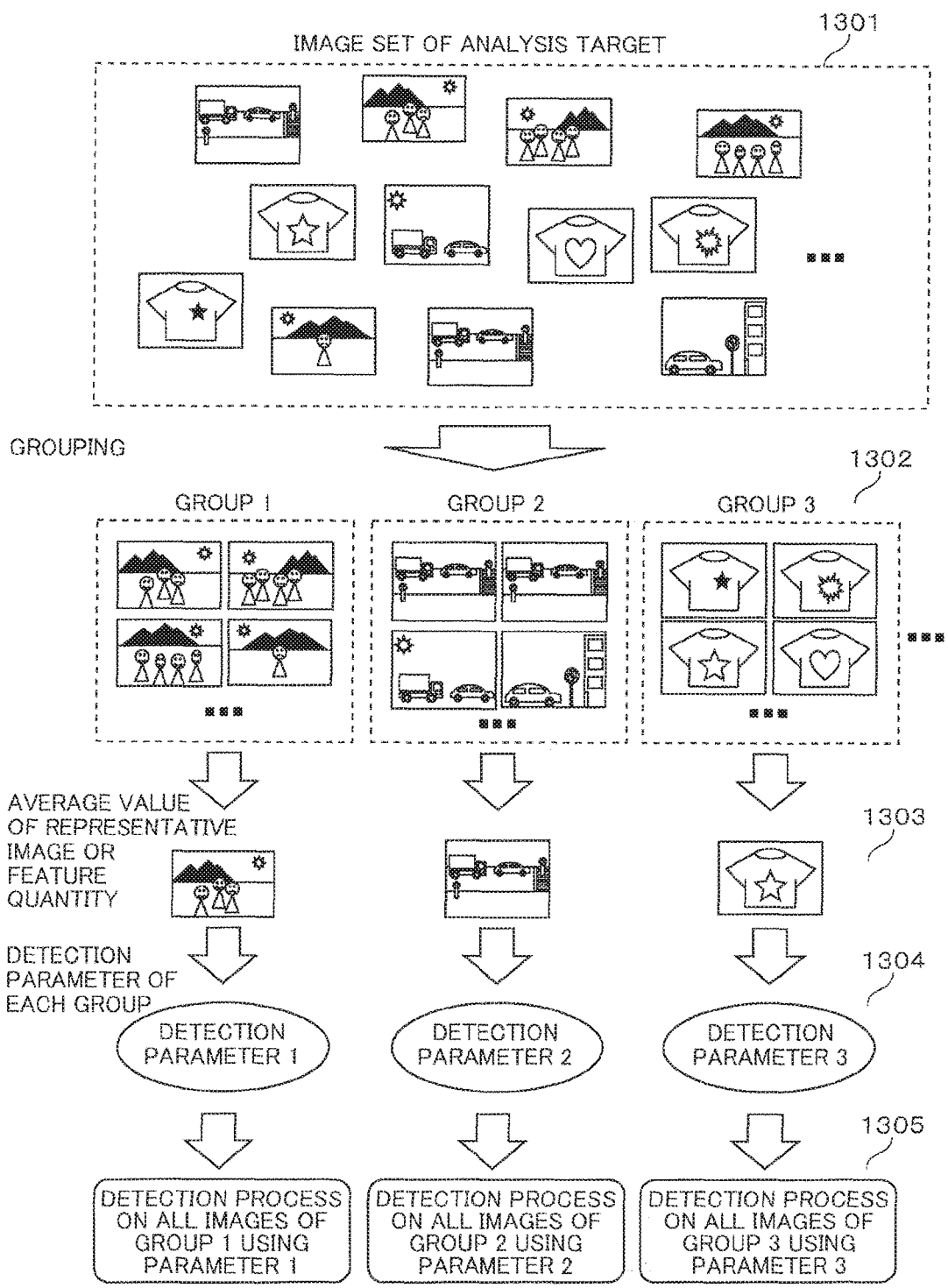
FIG. 13 is a diagram for describing an example of grouping an image set of an analysis target and performing batch processing through the image analysis device 105.

FIG. 13 is a diagram for describing batch processing using analysis target grouping. When an image set 1301 of an analysis target is given, the image analysis device 105 divides the image set into a plurality of groups using the image feature quantity (1302). As the group division method, the K-means technique described in the description of the similar image search of FIG. 3 may be used.

When the groups are formed, the similar image search unit 109 and the detection parameter deciding unit 110 perform the detection parameter estimation process for analyzing images of the respective groups. At this time, an average feature quantity vector of a group or a feature quantity of a representative image of a group may be used as a query of the similar image search (1303). Further, a plurality of representative images may be selected, and results of the similar image search may be integrated and used. As a result, one detection parameter is estimated for each group (1304).

The arbitrary object detecting unit 111 performs the detection process on all images belonging to each group using the parameter estimated for the corresponding group (1305). In the present technique, since it is unnecessary to perform the parameter estimation or the template reading for each image, an efficient process can be performed on a large amount of images.

Figure 14:
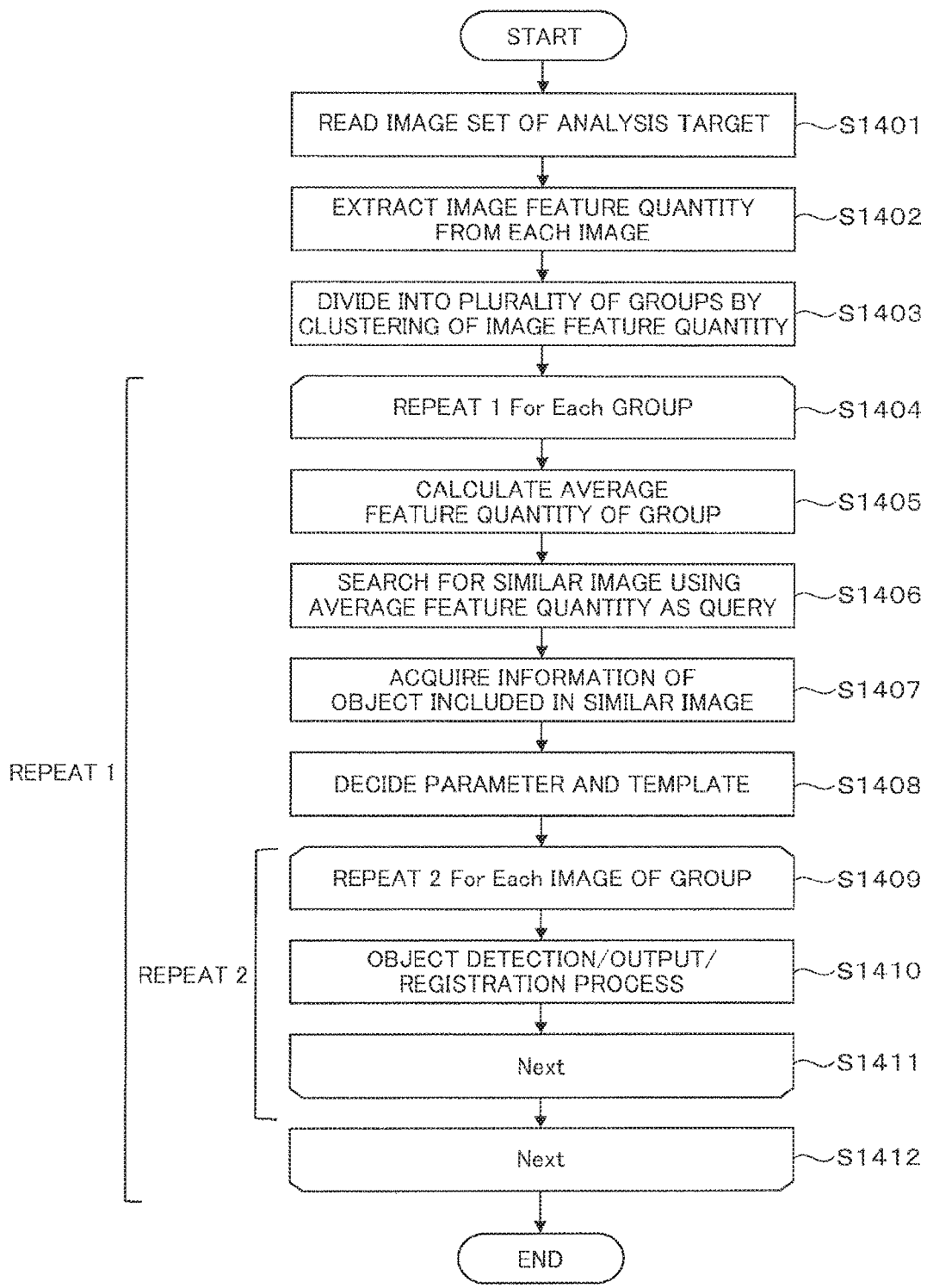
FIG. 14 is a flowchart for describing a procedure of grouping an image set of an analysis target and performing batch processing through the image analysis device 105.

FIG. 14 is a flowchart illustrating a procedure of performing the batch processing using input image grouping through the image analysis device 105.

Hereinafter, respective steps of FIG. 14 will be described.

[Reading of Image Set of Analysis Target]

(FIG. 14: Step S1401)

The image input unit 106 reads a plurality of images from the image/video storage device 101. When the analysis target is a video (a moving image), the video is divided into a plurality of frame images.

[Grouping of Image Set]

(FIG. 14: Step S1402)

The similar image search unit 109 extracts an image feature quantity from each of the plurality of read images.

(FIG. 14: Step S1403)

The similar image search unit 109 divides the image set into a plurality of groups based on the image feature quantity.

(FIG. 14: Steps S1404 to S1412)

The image analysis device 105 performs steps S1404 to S1412 on each group generated in step S1403.

[Average Value Calculation of Representative Image or Feature Quantity]

(FIG. 14: Step S1405)

The similar image search unit 109 calculates an average feature quantity of a group. When the feature quantity is indicated by a fixed length vector, the average feature quantity vector is obtained by calculating an average value of vector elements.

[Decision of Detection Parameter of Each Group]

(FIG. 14: Step S1406)

The similar image search unit 109 acquires a similar image from the image database 108 using the average feature quantity vector as a query.

(FIG. 14: Step S1407)

The similar image search unit 109 reads information of an object (a position and a size of an object in an image) included in the similar image from the image database 108 based on an ID of the similar image.

(FIG. 14: Step S1408)

The detection parameter deciding unit 110 decides the parameter used for the object detection using the information of the object included in the similar image. The parameter decision method has been described above with reference to FIG. 6, and a region serving as the analysis target or the type of the scanning window is decided. Further, as described above with reference to FIG. 8, the template used for the object detection process is decided.

[Detection Process on all Images in Group]

(FIG. 14: Steps S1409 to S1411)

The image analysis device 105 performs the object detection process on all the images in the group using the parameter and the template decided in step S1408, outputs the result, and registers the result in the database. A detailed processing procedure is similar to that illustrated in FIG. 7.

Third Embodiment

A third embodiment of the present invention will be described in connection with an exemplary configuration in which the image analysis system 100 is incorporated into a content cloud system. Hereinafter, an overview of the content cloud system will be first described, and then a method of incorporating the image analysis system 100 into the content cloud system as an analysis module will be described. The image analysis system 100 has the same configuration as in the first and second embodiments.

FIG. 15 is a schematic diagram of a content cloud system 1500 according to the third embodiment. The content cloud system 1500 includes an Extract Transform Load (ETL) module 1503, a content storage 1504, a search engine 1505, a metadata server 1506, and a multimedia server 1507. The content cloud system is operated in a common computer equipped with one or more CPUs, a memory, and a storage device, and configured with various modules. Further, there is a case in which each module may be executed by an independent computer, and in this case, each storage and module are connected via a network or the like, and it is implemented by distributed processing of performing data communication via the network or the like.

An application program 1508 transmits a request to the content cloud system 1500 via a network or the like, and the content cloud system 1500 transmits information according to the request to an application 1508.

The content cloud system 1500 receives data 1501 of an arbitrary format such as video data, image data, document data, or audio data as an input. The data 1501 is, for example, a picture trademark and an advertising document thereof, an image and an HTML document of a web site, and video data with closed caption or sound, or the like, and may be structured data or non-structured data. The data input to the content cloud system 1500 is temporarily accumulated in a storage 1502.

The ETL 1503 monitors the storage 1502, and performs the archive on information (metadata) obtained from a file system and stores the resultant data in the content storage 1504 when the data 1501 is stored in the storage 1502.

The content storage 1504 stores the information extracted by the ETL 1503 and the non-processed data 1501 temporarily accumulated in the storage 1502.

When the request is received from the application program 1508, for example, when the text search request is received, the search engine 1505 performs the text search based on an index generated by the ETL 1503, and transmits the search result to the application program 1508. A known technique may be applied as an algorithm of the search engine 1505. The search engine 1505 can be equipped with a module that searches for data such as an image or a sound as well as a text.

The metadata server 1506 manages metadata accumulated in a relational database (RDB). For example, a file name of data, a date of data registration, a type of original data, metadata text information, and the like which are extracted by the ETL 1503 are assumed to be registered in the RDB. When the request is received from the application 1508, the metadata server 1506 transmits information in the RDB to the application 1508 in response to the request.

The multimedia server 1507 operates an information extraction processing module 1509 according to corresponding data on data archived in the content storage 1504, and extracts metadata related to the content of the data.

The information extraction processing module 1509 is configured with, for example, a text index module, an image recognition module, and the like. Examples of the metadata include a time, an N-gram index, an image recognition result (an object name and region coordinates in an image), an image feature quantity and a relevant term thereof, and a voice recognition result. As the information extraction module 1509, any program that performs information (metadata) extraction can be used, and a known technique can be employed, and thus a description of the information extraction processing module 1509 is omitted herein.

The metadata extracted from each media data is accumulated in a graph DB 1511 structured in a graph form in association with each other. As an example of the relevant diagram, for a voice recognition result of "apple" accumulated in the content storage 1504, a correspondence relation of an original audio file, image data, a relevant term, and the like can be expressed in a network form. When a request is received from the application 1508, the multimedia server 1507 transmits corresponding meta information to the application 1508. For example, when a request of "apple" is received, meta information associated on a network graph such as an image including an apple, an average rate, a song title of an artist, and the like is provided based on a constructed graph structure.

The image analysis system 100 in the content cloud system 1500 functions as the information extraction processing module 1509 in the multimedia server 1507. The image/video storage device 101 and the data storage device 104 in FIG. 1 correspond to the content storage 1504 and the graph DB 1511 in FIG. 15, respectively. Further, the image analysis device 105 corresponds to the information extraction processing module 1509. When a plurality of information extraction processing modules 1509 are incorporated into the multimedia server 1507, resources of one computer may be shared, and an independent computer may be used for each module. The image database 108 of FIG. 1 corresponds to dictionary data 1510 necessary when the multimedia server 1507 performs the information extraction.

<Third Embodiment: Conclusion>

As described above, the image analysis system 100 according to the present invention can be applied as a constituent element of the content cloud system 1500. The content cloud system 1500 can integrate information of media by generating metadata available in common to each media data. As a result, it is possible to provide information having a high added value to the user.

The present invention is not limited to the above embodiments, and includes various modified examples. The above embodiments have been described in detail to help with understanding of the present invention, and the present invention is not necessarily limited to one which is equipped with all components described above. Further, some components of a certain embodiment may be replaced with components of another embodiment. Furthermore, a component of another embodiment may be added to a component of a certain embodiment. Moreover, addition, deletion, or replacement of other components may be performed on some components of each embodiment.

All or some of components, functions, processing units, processing means, and the like described above may be implemented by hardware, for example, may be designed as an integrated circuit. Further, the components, the functions, and the like described above may be implemented by software such that a processor interprets a program for implementing the functions and executes the program. Information such as a program, a table, or a file for implementing the functions may be stored in a recording device such as a memory, a hard disk, or a Solid State Drive (SSD) or a recording medium such as an IC card, an SD card, or a DVD.

REFERENCE SIGNS LIST

100 Image analysis system
101 Image/video storage device
102 Input device
103 Display device
104 Data storage device
105 Image analysis device
106 Image input unit
107 User operation input unit
108 Image database
109 Similar image search unit
110 Detection parameter deciding unit
111 Arbitrary object detecting unit
112 Image registering unit
113 Data output unit
1500 Content cloud system

The invention claimed is:

1. An image analysis device, comprising:
an image storage unit that stores an image and information of a detected object included in the image;
an image input unit that receives a target image serving as a target in which an object is detected;
a similar image search unit that searches for a similar image having a feature quantity similar to a feature quantity extracted from the target image and the information of the detected object included in the similar image from the image storage unit;
a parameter deciding unit that decides a parameter used in a detection process performed on the target image based on the information of the detected object included in the similar image;
a detecting unit that detects the object from the target image according to the decided parameter;
an image registering unit that accumulates the detected object, the target image, and a degree of reliability of the object in the image storage unit; and
a data output unit that outputs the information of the detected object;
wherein the information stored in the image storage unit includes a feature quantity extracted from the image, position information of the detected object, and a feature quantity extracted from the detected object;
wherein the parameter deciding unit performs a parameter estimation process of deciding a size and a scanning range of a scanning window used in the detection process from the position information of the detected object included in the similar image; and
wherein the parameter deciding unit performs the parameter estimation process of deciding the size and the scanning range of the scanning window used in the detection process according to an input from a user;
the parameter deciding unit generates a list of IDs of the detected objects included in the similar image and transmits the list to the detecting unit;
the detecting unit acquires information of similar objects having the similar feature quantity from the image storage unit with respect to the IDs of the detected objects included in the list, and adds the information to the list; and
the detecting unit detects the object included in the target image based on the similar feature quantity of the similar objects included in the list.

2. The image analysis device according to claim 1,
wherein the detecting unit detects a region having a feature quantity similar to a feature quantity of the detected object included in the similar image as the object included in the target image.

3. The image analysis device according to claim 1,
wherein the image input unit performs a process of grouping a plurality of target images based on the feature quantity of the target image when the plurality of target images are input,
the parameter deciding unit decides one parameter on a group generated in the image input unit, and
the detecting unit performs detection on the group using the one parameter.

4. An image analysis system, comprising:
a camera that photographs an image;
an image storage unit that stores an image and information of a detected object included in the image;

an image input unit that receives a target image serving as a target in which an object is detected;

a similar image search unit that searches for a similar image having a feature quantity similar to a feature quantity extracted from the target image and the information of the detected object included in the similar image from the image storage unit;

a parameter deciding unit that decides a parameter used in a detection process performed on the target image based on the information of the detected object included in the similar image;

a detecting unit that detects the object from the target image according to the decided parameter;

an image registering unit that accumulates the detected object, the target image, and a degree of reliability of the object in the image storage unit;

a display unit that displays the information of the detected object; and an external input unit that receives an input from a user;

wherein the information stored in the image storage unit includes a feature quantity extracted from the image, position information of the detected object, and a feature quantity extracted from the detected object;

wherein the parameter deciding unit performs a parameter estimation process of deciding a size and a scanning range of a scanning window used in the detection process from the position information of the detected object included in the similar image; and wherein the parameter deciding unit performs the parameter estimation process of deciding the size and the scanning range of the scanning window used in the detection process according to an input from the external input unit;

the parameter deciding unit generates a list of IDs of the detected objects included in the similar image and transmits the list to the detecting unit;

the detecting unit acquires information of similar objects having the similar feature quantity from the image storage unit with respect to the IDs of the detected objects included in the list, and adds the information to the list; and the detecting unit detects the object included in the target image based on the similar feature quantity of the similar objects included in the list.

5. The image analysis system according to claim 4, wherein the detecting unit detects a region having a feature quantity similar to a feature quantity of the detected object included in the similar image as the object included in the target image.

6. The image analysis system according to claim 4, wherein the image input unit performs a process of grouping a plurality of target images based on the feature quantity of the target image when the plurality of target images are input, the parameter deciding unit decides one parameter on a group generated in the image input unit, and the detecting unit performs detection on the group using the one parameter.

7. An image analysis method of detecting an object from an input target image, comprising:

an extraction step of extracting a feature quantity of the target image;

a search step of searching for a similar image having a feature quantity similar to the extracted feature quantity of the target image from an image storage unit;

a decision step of deciding a parameter used in a detection process on the target image, by a parameter deciding unit, based on information of a detected object included in the searched similar image;

a detection step of performing a detection process, by a detecting unit, on the target image based on the decided parameter to detect the object;

a step of outputting the object detected from the target image;

a storage step of storing the target image, the detected object, and a degree of reliability of the object in the image storage unit, wherein information stored in the image storage unit includes a feature quantity extracted from the image, position information of the detected object, and a feature quantity extracted from the detected object; and a parameter estimation step of deciding a size and a scanning range of a scanning window used in the detection step from the position information of the detected object included in the similar image;

wherein the parameter deciding unit performs the parameter estimation process of deciding the size and the scanning range of the scanning window used in the detection process according to an input from a user;

the parameter deciding unit generates a list of IDs of the detected objects included in the similar image and transmits the list to the detecting unit;

the detecting unit acquires information of similar objects having the similar feature quantity from the image storage unit with respect to the IDs of the detected objects included in the list, and adds the information to the list; and the detecting unit detects the object included in the target image based on the similar feature quantity of the similar objects included in the list.

* * * * *